(12) United States Patent
Gladstone et al.

(10) Patent No.: US 10,785,245 B2
(45) Date of Patent: Sep. 22, 2020

(54) METHODS FOR USING ORGANIZATIONAL BEHAVIOR FOR RISK RATINGS

(71) Applicant: BitSight Technologies, Inc., Boston, MA (US)

(72) Inventors: Philip John Steuart Gladstone, Carlisle, MA (US); Alan Joseph Kirby, Hollis, NH (US); John Matthew Truelove, Cambridge, MA (US); David Feinzeig, Stoneham, MA (US); Nagarjuna Venna, Waltham, MA (US); Stephen Boyer, Wayland, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/405,121

(22) Filed: May 7, 2019

(65) Prior Publication Data

US 2019/0260791 A1    Aug. 22, 2019

Related U.S. Application Data

(63) Continuation of application No. 15/216,955, filed on Jul. 22, 2016, now Pat. No. 10,326,786, which is a
(Continued)

(51) Int. Cl.
*H04L 29/06* (2006.01)
*G06F 3/0484* (2013.01)
(Continued)

(52) U.S. Cl.
CPC ........ *H04L 63/1425* (2013.01); *G06F 3/0484* (2013.01); *G06Q 30/0277* (2013.01);
(Continued)

(58) Field of Classification Search
CPC ............. H04L 63/1425; H04L 63/1433; H04L 63/1441; H04L 61/1511; H04L 63/1416;
(Continued)

(56) References Cited

U.S. PATENT DOCUMENTS

| 5,867,799 A | 2/1999 | Lang et al. |
| 6,016,475 A | 1/2000 | Miller et al. |

(Continued)

FOREIGN PATENT DOCUMENTS

| CA | 3015146 A1 | 8/2017 |
| WO | 2017/142694 A1 | 8/2017 |
| WO | 2019/023045 A1 | 1/2019 |

OTHER PUBLICATIONS

"A Survey of Trust and Risk Metrics for a BYOD Mobile Worker World : Third International Conference on Social Eco-Informatics, 2013, 11 pages", by SEIGNEUR et al. (Year: 2013).*
(Continued)

*Primary Examiner* — Oleg Korsak
(74) *Attorney, Agent, or Firm* — Goodwin Procter LLP

(57) ABSTRACT

Among other things, traces are received of activities of an online user who is associated with an entity. By analysis of the traces a security state of the entity is inferred. Also, a map is generated between (a) technical assets that contribute to security characteristics of respective entities and (b) the identities of the entities that are associated with the respective technical assets. At least part of the generating of the map is done automatically. A user can be engaged to assist in the generating of the map by presenting to the user through a user interface (a) data about the technical assets of entities and (b) an interactive tool for associating the technical assets with the identities of the entities.

30 Claims, 16 Drawing Sheets

Figure 1:
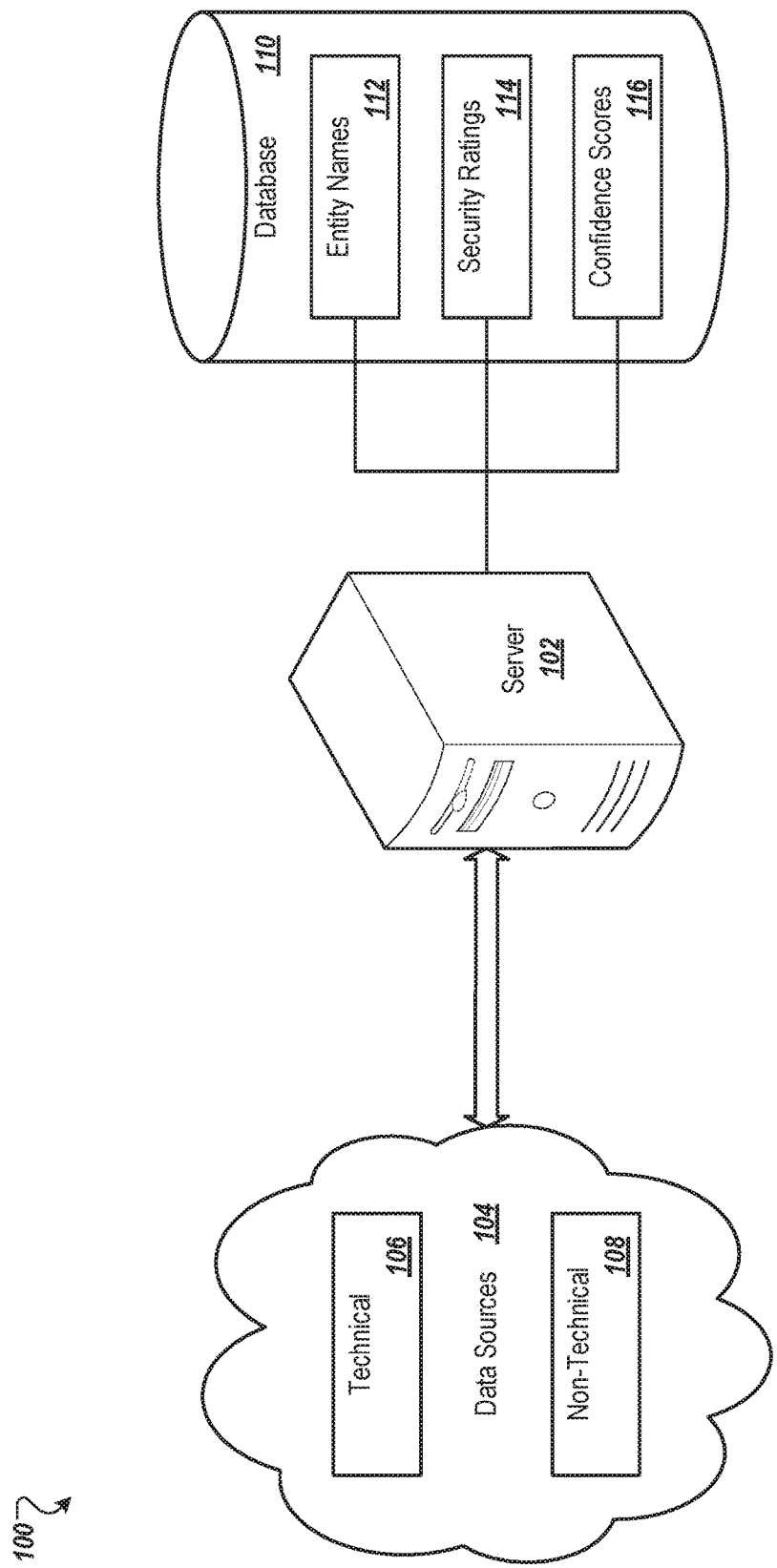

Related U.S. Application Data continuation of application No. 14/021,585, filed on Sep. 9, 2013, now Pat. No. 9,438,615.

(51) Int. Cl.
  *G06Q 30/02* (2012.01)
  *G06Q 50/00* (2012.01)
  *H04L 29/12* (2006.01)

(52) U.S. Cl.
  CPC .......... *G06Q 50/01* (2013.01); *H04L 61/1511* (2013.01); *H04L 63/1416* (2013.01); *H04L 63/1433* (2013.01); *H04L 63/1441* (2013.01)

(58) Field of Classification Search
  CPC ... G06F 3/0484; G06Q 30/0277; G06Q 50/01
  See application file for complete search history.

(56) References Cited

U.S. PATENT DOCUMENTS

| | | |
|---|---|---|
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| D652,048 S | 1/2012 | Joseph |
| D667,022 S | 9/2012 | LoBosco et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| D691,164 S | 10/2013 | Lim et al. |
| D694,252 S | 11/2013 | Helm |
| D694,253 S | 11/2013 | Helm |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park et al. |
| 9,053,210 B2 | 6/2015 | Elnikety et al. |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani et al. |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Bads et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D819,687 S | 6/2018 | Yampolskiy et al. |
| 10,044,750 B2 | 8/2018 | Livshits et al. |
| 10,142,364 B2 | 11/2018 | Baukes et al. |
| 10,180,966 B1* | 1/2019 | Lang ..................... G06Q 50/01 |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,257,219 B1 | 4/2019 | Geil et al. |
| 10,305,854 B2 | 5/2019 | Alizadeh-Shabdiz et al. |
| 10,339,321 B2 | 7/2019 | Tedeschi |
| 10,339,484 B2 | 7/2019 | Pai et al. |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0066195 A1 | 3/2005 | Jones |
| 2005/0071450 A1 | 3/2005 | Allen et al. |
| 2005/0076245 A1 | 4/2005 | Graham et al. |

(56) References Cited

U.S. PATENT DOCUMENTS

| | | |
|---|---|---|
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1* | 7/2005 | Roetter .................. G06Q 30/02 |
| | | 705/14.42 |
| 2005/0234767 A1* | 10/2005 | Bolzman .......... G06Q 10/06393 |
| | | 705/7.39 |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1* | 9/2006 | Shull ...................... G06F 21/55 |
| | | 726/1 |
| 2006/0253581 A1 | 11/2006 | Dixon et al. |
| 2007/0067845 A1 | 3/2007 | Wiemer et al. |
| 2007/0143851 A1 | 6/2007 | Nicodemus et al. |
| 2007/0198275 A1 | 8/2007 | Malden et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0162931 A1 | 7/2008 | Lord et al. |
| 2008/0172382 A1 | 7/2008 | Prettejohn |
| 2008/0175266 A1* | 7/2008 | Alperovitch ......... G06Q 10/107 |
| | | 370/465 |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra et al. |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0231395 A1 | 9/2011 | Vadlamani et al. |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0215892 A1 | 8/2012 | Wanser et al. |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0019196 A1 | 1/2014 | Wiggins et al. |
| 2014/0108474 A1 | 4/2014 | David et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0337633 A1 | 11/2014 | Yang et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0180883 A1 | 6/2015 | Aktas et al. |
| 2015/0261955 A1 | 9/2015 | Huang et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0350229 A1 | 12/2015 | Mitchell |
| 2015/0381649 A1 | 12/2015 | Schultz et al. |
| 2016/0065613 A1 | 3/2016 | Cho et al. |
| 2016/0119373 A1 | 4/2016 | Fausto et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0189301 A1 | 6/2016 | Ng et al. |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0316324 A1 | 11/2017 | Barrett et al. |
| 2017/0324766 A1 | 11/2017 | Gonzalez Granadillo et al. |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0322584 A1 | 11/2018 | Crabtree et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2019/0034845 A1 | 1/2019 | Mo et al. |
| 2019/0140925 A1 | 5/2019 | Pon et al. |
| 2019/0147378 A1 | 5/2019 | Mo et al. |
| 2019/0379632 A1 | 12/2019 | Dahlberg et al. |
| 2019/0392252 A1 | 12/2019 | Fighel et al. |

OTHER PUBLICATIONS

"About Nea4j," 1 page.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for

(56) References Cited

OTHER PUBLICATIONS

Information Infrastructure Protection, 2009, 17 pages.
"Assuring a Trusted and Resilient Information and Communications Infrastructure," Cyberspace Policy Review, May, 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Gephi (gephi.org)," accessed on the internet at https://web.archive.org/web/20151216223216/https://gephi.org/; Dec. 16, 2015; 1 page.
"Master Security Criteria," Version 3.0, BITS Financial Services Security Laboratory, Oct. 2001, 47 pages.
"mile 2 CPTE Maltego Demo," accessed on the internet at https://www.youtube.com/watch?v=o2oNKOUzPOU; Jul. 12, 2012; 1 page.
"Neo4j (neo4j.com)," accessed on the internet at https://web.archive.org/web/20151220150341/http://neo4j.com:80/developer/ guide-data-visualization/; Dec. 20, 2015; 1 page.
"Palantir Cyber: Uncovering malicious behavior at petabyte scale," accessed on the internet at https://www.youtube.com/watch?v=_EhYezVO6EE; Dec. 21, 2012; 1 page.
"Palantircom," accessed on the internet at http://www.palantircom/; Dec. 2015; 2 pages.
"Plugging the Right Holes," Lab Notes, MIT Lincoln Library, Posted Jul. 2008, retrieved Sep. 14, 2010 from http://www.11.miLedufpublicationsflabnotesfpluggingtherighthol . . . 2 pages.
"Rapid7 Nexpose Vulnerability Scanner," accessed on the internet at https://www.rapid7.com/products/nexpose/download/, 5 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," Bits, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, PAIR transaction history and pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Bhilare et al., "Protecting Intellectual Property and Sensitive Information in Academic Campuses from Trusted Insiders: Leveraging Active Directory", SIGUCC, Oct. 2009, 5 pages.
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Carstens, et al., "Modeling Company Risk and Importance in Supply Graphs," European Semantic Web Conference 2017: The Semantic Web pp. 18-31.
Chu, Matthew, et al. "Visualizing Attack Graphs, Reachability, and Trust Relationships with NAVIGATOR," MIT Lincoln Library, VizSEC '10, Ontario, Canada, Sep. 14, 2010, 12 pages.
Chuvakin, "SIEM: Moving beyond compliance", RSA White Paper, 2010, 16 pages.
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796, 8 pages.
Hacking Exposed 6, S. McClure et al., copyright 2009, 37 pages.
Ingots, Kyle, et al., "Modeling Modern Network Attacks and Countermeasures Using Attack Graphs," MIT Lincoln Laboratory, 16 pages.
Ingots, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingots, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al, "Identifying and tracking suspicious activities through IP gray space analysis", MineNet, Jun. 12, 2007, 6 pages.
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013, 15 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.

(56) References Cited

OTHER PUBLICATIONS

Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisation- with-bgplay), Sep. 30, 2015, 8 pages.
MaxMind, https://www.maxmind.com/en/about-maxmind, https://www.maxmind.com/en/geoip2-isp-database, date accessed Sep. 28, 20116, 3 pages.
MCNAB, "Network Security Assessment," copyright 2004, 55 pages.
Method Documentation, CNSS Risk Assessment Tool Version 1.1, Mar. 31, 2009, 24 pages.
Moradi, et al., "Quantitative Models for Supply Chain Management," IGI Global, 2012, 29 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
PAIR transaction history and pending claims for U.S. Appl. No. 14/021,585, as of Apr. 29, 2016, 2 pages.
PAIR transaction history and pending claims for U.S. Appl. No. 14/021,585, as of Nov. 18, 2015, 6 pages.
PAIR transaction history of U.S. Appl. No. 13/240,572 and pending claims as of Mar. 22, 2016, 10 pages.
PAIR transaction history of U.S. Appl. No. 13/240,572, as of Oct. 7, 2015, application as filed and pending claims, 45 pages.
PAIR transaction history of U.S. Appl. No. 14/021,585 and pending claims as of Mar. 22, 2016, 2 pages.
PAIR transaction history of U.S. Appl. No. 14/021,585, as of Oct. 7, 2015 and application as filed, 70 pages.
PAIR transaction history of U.S. Appl. No. 14/944,484 and pending claims as of Mar. 22, 2016, 4 pages.
PAIR transaction history of U.S. Appl. No. 61/386,156, as of Oct. 7, 2015, 2 pages.
PAIR transaction history, application as filed and pending claims for U.S. Appl. No. 13/240,572, as of Apr. 29, 2016, 46 pages.
PAIR transaction history, application as filed and pending claims for U.S. Appl. No. 14/944,484, as of Apr. 29, 2016, 4 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost in the Browser Analysis of Web-based Malware", 2007, 9 pages.
Rare Events, Oct. 2009, Jason, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics vI.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory" Int. J. Production Economics 126 (2010)121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
U.S. Appl. No. 15/215,955, Published as: US2016/0330231, Methods for Using Organizational Behavior for Risk Ratings, filed Jul. 22, 2016.
U.S. Appl. No. 15/089,375, U.S. Pat. No. 10,176,445 Published as: US2017/0236079, Relationships Among Technology Assets and Services and the Entities Responsible for Them, filed Apr. 1, 2016.
U.S. Appl. No. 29/598,298, U.S. Pat. No. D835,631, Computer Display Screen With Graphical User, filed Mar. 24, 2017.
U.S. Appl. No. 29/598,299, U.S. Pat. No. D818,475, Computer Display With Security Ratings Graphical User Interface, filed Mar. 24, 2017 With Security.
U.S. Appl. No. 29/599,622, U.S. Pat. No. D847,169, Computer Display With Security Ratings Graphical User Interface, filed Apr. 5, 2017.
U.S. Appl. No. 29/599,620, U.S. Pat. No. D846,562, Computer Display With Security Ratings Graphical User Interface, filed Apr. 5, 2017.
U.S. Appl. No. 16/543,075, Methods for Mapping IP Addresses and Domains to Organizations Using User Activity Data, filed Aug. 16, 2019.
U.S. Appl. No. 15/918,286, U.S. Pat. No. 10,257,219, Correlated Risk in Cybersecurity, filed Mar. 12, 2018.
U.S. Appl. No. 16/292,956, Correlated Risk in Cybersecurity, filed Mar. 5, 2019.
U.S. Appl. No. 15/954,921, Systems and Methods for External Detection of Misconfigured, filed Apr. 17, 2018.
U.S. Appl. No. 29/666,942, Computer Display With Forecast Graphical User Interface, filed Oct. 17, 2018.
U.S. Appl. No. 29/677,306, Computer Display With Corporate Hierarchy Graphical User Interface, filed Jan. 18, 2019.
U.S. Appl. No. 15/215,955, the Office Actions dated Nov. 4, 2016, Mar. 9, 2017, Jun. 6, 2017, and Aug. 29, 2018, and the Notice of Allowance dated Feb. 6, 2019.
U.S. Appl. No. 13/240,572, the Office Actions dated May 7, 2013, Nov. 21, 2013, Jun. 16, 2014, Feb. 27, 2015, Jun. 3, 2015, Oct. 26,

(56) References Cited

OTHER PUBLICATIONS

2015, Mar. 10, 2016, Feb. 13, 2017, and Examiner's Answer to Appeal Brief dated May 16, 2018;.
U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017;.
U.S. Appl. No. 15/044,952, the Office Action dated Jul. 8, 2019;.
U.S. Appl. No. 29/599,622, now U.S. Pat. No. D847,169, the Notice of Allowance dated Dec. 11, 2018;.
U.S. Appl. No. 29/599,620, now U.S. Pat. No. D846,562, the Notice of Allowance dated Nov. 27, 2018;.
U.S. Appl. No. 16/015,686, the Office Action dated Nov. 16, 2018 and the Notice of Allowance dated May 10, 2019;.
U.S. Appl. No. 15/918,286, the Office Action dated Aug. 7, 2018 and the Notice of Allowance dated Nov. 29, 2018;.
U.S. Appl. No. 16/292,956, the Office Action dated Jul. 10, 2019;.
U.S. Appl. No. 16/170,680, the Office Action dated Mar. 26, 2019;.
U.S. Appl. No. 15/954,921, the Office Actions dated Sep. 4, 2018, Jan. 3, 2019, and Aug. 19, 2019; and .
U.S. Appl. No. 16/360,641, the Office Action dated Aug. 7, 2019.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
U.S. Appl. No. 15/377,574, U.S. Pat. No. 9,705,932, Methods and Systems for Creating, De-Duplicating, and Accessing Data Using an Object Storage System, filed Dec. 13, 2016.
U.S. Appl. No. 14/021,585, U.S. Pat. No. 9,438,615, Published as: US2015/0074579, Security Risk Management, filed Sep. 9, 2013.
U.S. Appl. No. 15/216,955, Published as: US2016/0330231, Methods for Using Organizational Behavior for Risk Ratings, filed Jul. 22, 2016.
U.S. Appl. No. 15/239,063, Published as: US2017/0093901, Security Risk Management, filed Aug. 17, 2016.
U.S. Appl. No. 13/240,572, Published as: US2016/0205126, Information Technology Security Assessment System, filed Sep. 22, 2011.
U.S. Appl. No. 14/944,484, U.S. Pat. No. 9,973,524, Published as: US2016/0323308, Information Technology Security Assessment System, filed Nov. 18, 2015.
U.S. Appl. No. 15/142,677, U.S. Pat. No. 9,830,569, Published as: US/2016/0239772, Security Assessment Using Service Provider Digital Asset Information, filed Apr. 29, 2016.
U.S. Appl. No. 15/134,845, U.S. Pat. No. 9,680,858, Annotation Platform for a Security Risk System, filed Apr. 21, 2016.
U.S. Appl. No. 15/044,952, Published as: US2017/0236077, Relationships Among Technology Assets and Services and the Entities Responsible for them, filed Feb. 16, 2016.
U.S. Appl. No. 15/089,375, U.S. Pat. 10,176,445, Published as: US2017/0236079, Relationships Among Technology assets and Services and the Entities Responsible for them, filed Apr. 1, 2016.
U.S. Appl. No. 29/598,298, U.S. Pat. No. D835,631, Computer Display Screen With Graphical User Interface, filed Mar. 24, 2017.
U.S. Appl. No. 29/598,299, U.S. Pat. No. D818,475, Computer Display With Security Ratings Graphical User Interface, filed Mar. 24, 2017.
U.S. Appl. No. 29/599,622, Computer Display With Security Ratings Graphical User Interface, filed Apr. 5, 2017.
U.S. Appl. No. 29/599,620, Computer Display With Security Ratings Graphical User Interface, filed Apr. 5, 2017.
U.S. Appl. No. 16/015,686, Methods for Mapping IP Addresses and Domains to Organizations Using User Activity Data, filed Jun. 22, 2018.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 15/954,921, Systems and Methods for External Detection of Misconfigured Systems, filed Apr. 17, 2018.
U.S. Appl. No. 16/549,764, Systems and Methods for Inferring Entity Relationships Via Network Communications of Users or User Devices, filed Aug. 23, 2019.
U.S. Appl. No. 16/787,650, Systems and Methods for Inferring Entity Relationships Via Network Communications of Users or User Devices, filed Feb. 11, 2020.
U.S. Appl. No. 16/583,991, Systems and Methods for Network Asset Discovery and Association Thereof With Entities, filed Sep. 26, 2019.
U.S. Appl. No. 29/666,942, Computer Display With Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 16/779,437, Systems and Methods for Rapidly Generating Security Ratings, filed Jan. 31, 2020.
U.S. Appl. No. 16/802,232, Systems and Methods for Improving a Security Profile of an Entity Based on Peer Security Profiles, filed Feb. 26, 2020.
U.S. Appl. No. 29/725,724, Computer Display With Risk Vectors Graphical User Interface, filed Feb. 26, 2020.
U.S. Appl. No. 15/377,574, now U.S. Pat. No. 9,705,932, the Office Action dated Mar. 2, 2017 and the Notice of Allowance dated Jun. 1, 2017;.
U.S. Appl. No. 14/021,585, now U.S. Pat. No. 9,438,615, the Office Action dated Mar. 11, 2016 and the Notice of Allowance dated Aug. 9, 2016;.
U.S. Appl. No. 15/216,955, the Office Actions dated Nov. 4, 2016, Mar. 9, 2017, Jun. 6, 2017, Dec. 5, 2017, and Aug. 29, 2018, and the Notice of Allowance dated Feb. 6, 2019;.
U.S. Appl. No. 15/239,063, the Office Action dated Mar. 21, 2018 and the Notice of Allowance dated Jan. 14, 2019;.
U.S. Appl. No. 13/240,572, the Office Action dated, Jun. 16, 2004, Nov. 21, 2013, Jun. 3, 2015, Feb. 27, 2015, Oct. 26, 2015, Mar. 10, 2016, Feb. 13, 2017 and the Notice of Allowance dated May 15, 2020, Feb. 18, 2016, May 22, 2015, May 7, 2014.
U.S. Appl. No. 14/944,484, now U.S. Pat. No. 9,973,524, the Office Actions dated Mar. 22, 2016, Jul. 5, 2016, and Jan. 17, 2017 and the Notice of Allowance dated Oct. 20, 2017;.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018;.
U.S. Appl. No. 29/598,298, now U.S. Pat. No. D835,631, the Notice of Allowance dated Aug. 15, 2018;.
U.S. Appl. No. 29/598,299, now U.S. Pat. No. D818,475, the Notice of Allowance dated Jan. 2, 2018;.
U.S. Appl. No. 29/599,622, the Notice of Allowance dated Dec. 11, 2018;.
U.S. Appl. No. 29/599,620, the Notice of Allowance dated Nov. 27, 2018;.

(56) References Cited

OTHER PUBLICATIONS

U.S. Appl. No. 16/015,686, the Office Action dated Nov. 16, 2018; the Notice of Allowance dated May 10, 2019;.
U.S. Appl. No. 15/918,286, the Office Action dated Aug. 7, 2018 and the Notice of Allowance dated Nov. 29, 2018; and.
U.S. Appl. No. 16/292,956, the Office Action dated Jul. 10, 2019; the Notices of Allowance dated Jan. 8, 2020, Jan. 27, 2020;.
U.S. Appl. No. 16/795,056, the Office Action dated May 1, 2020;.
U.S. Appl. No. 16/170,680, the Office Action dated Mar. 26, 2019; the Notices of Allowance dated Oct. 29, 2019 and Aug. 27, 2019;.
U.S. Appl. No. 16/688,647, the Office Action dated Jan. 29, 2020;.
U.S. Appl. No. 15/954,921, the Office Actions dated Aug. 19, 2019, Sep. 4, 2018 and Jan. 3, 2019; Advisory Action dated Mar. 3, 2020;.
U.S. Appl. No. 16/787,650, the Notice of Allowance dated Apr. 7, 2020;.
U.S. Appl. No. 16/583,991, the Office Action dated Jan. 13, 2020;.
U.S. Appl. No. 26/666,942, the Notice of Allowance dated Apr. 30, 2020;.
U.S. Appl. No. 16/360,641, the Office Actions dated Aug. 7, 2019 and Feb. 20, 2020;.
U.S. Appl. No. 16/514,771, the Office Action dated Dec. 4, 2019; the Notice of Allowance dated Mar. 18, 2020; and.
U.S. Appl. No. 16/802,232, the Notice of Allowance dated Apr. 24, 2020.

\* cited by examiner

Add backlog

| | |
|---|---|
| Entity Name: | Sample Entity _602_ |
| URL: | www.sample.com _604_ |
| Requested By: | 2013/09/17  Today  _606_ |
| Priority: | High ▶ _608_ |
| State: | Pending _610_ |
| Customer Name: | Customer A _612_ |
| Requestor: | requestor _614_ |
| Assigned To: | mapper1@test.com _616_ |
| Approver: | approver _618_ |
| Comments: | _620_ |

(Save) (Save and continue editing) (Save and add another)

FIG. 6

Select backlog to change

🔍 [         ] (Search)    (Unapproved items 714)  (Clear Filters 712)  (Add backlog 710) (+)

| Entity Name | URL | Requested By | Priority | State | Customer Name | Requestor | Assigned To | Approver |
|---|---|---|---|---|---|---|---|---|
| Sample Entity | www.sample... | 2013/09/17 | High | Pending | Customer A | requestor | mapper1@... | approver |
| Entity Two | www.two.com | 2013/11/22 | Low | Mapp... | Customer C | requestor | mapper2@... | approverB |
| Entity C | www.ec.com | 2013/09/23 | Medium | Waitin... | Customer J | requestor | mapper1@... | approverB |
| ABC | www.abc.com | 2014/05/25 | Low | Pending | Customer A | requestor | mapper1@... | approver |

702

By state 704
[All]
Pending
Mapping in Progress
Waiting for Maintenance
Waiting for Approval
Finalize Entity
Approval in Progress
Approved
Rejected by Entity Mapper
Duplicate
Unmappable

By assigned to 706
[All]
mapper1@test.com
mapper2@test.com
mapper3@abc.com
approver
requestor

By approver 708
[All]
approver
approverB

FIG. 7

| Change backlog | |
|---|---|
| Entity Name: | Sample Entity |
| URL: | www.sample.com |
| Requested By: | September 17, 2013 |
| Priority: | High |
| State: | Pending ⌒ 804 |
| Customer Name: | Customer A |
| Requestor: | requestor |
| Assigned To: | mapper1@test.com |
| Start Time: | September 3, 2013, 1:03 pm ⌒ 806 |
| End Time: | (None) ⌒ 808 |
| Approver: | approver |
| Comments: | |

Start Mapping *802*    Entity    History

Save and add another    Save and continue editing    Save

Auto-Fetching (Entity: Sample Entity)

Search WhoisRWS  *sample*  _1202_

Fetch _1208_

Customers | Organizations

_1204_

Search

| Organization | Handle | Select |
|---|---|---|
| Freesamples.com | FREESA-1 | ☐ |
| Sample Entity | SE-ABC | ☑ _1206a_ |
| Great Samples | GS-79 | ☑ _1206b_ |
|  |  | ☐ _1206c_ |

Search

Network _1212_ ▶

| Handle | NET-199-250-... ▶ |
| IP Range | 199.250.133.0-1... |
| Registration Date | 2012/07/27 |
| Last Updated | 2012/07/27 |
| ARIN comment |  |
| Mapper comment |  |
| Select? | Yes |
| Status |  |

Point of Contact _1214_ ▶

| Description | Admin |
| Name | Contact A |
| Company | Sample Entity |
| Address | 1455 Pennsylvani... |
| Last Updated | 2012/07/27 |
| Email | contact.a@sample... |
| Phone | 1-800-726-7532 |
| Comment |  |

Clear   Save Selected CIDRs _1218_

Search

Customers | Organizations

| Organization | Handle | Address | Networks | POCs | Comments | Select |
|---|---|---|---|---|---|---|
| Freesamples.com | FREESA-1 | 1235 Howard Street... | None | 1 |  | ☐ |
| Sample Entity | SE-ABC | 1455 Pennsylvania A... | 1 | 2 |  | ☑ _1216a_ |
|  |  |  |  |  |  | ☑ _1216b_ |

_1210_

FIG. 12

METHODS FOR USING ORGANIZATIONAL BEHAVIOR FOR RISK RATINGS

CROSS-REFERENCE TO RELATED APPLICATIONS

This application is a continuation of U.S. patent application Ser. No. 15/216,955, filed on Jul. 22, 2016 and titled "METHODS FOR USING ORGANIZATIONAL BEHAVIOR FOR RISK RATINGS", which is a continuation of U.S. patent application Ser. No. 14/021,585, filed on Sep. 9, 2013, entitled "SECURITY RISK MANAGEMENT", the contents of each of which are hereby incorporated herein in their entireties by reference.

This application relates to U.S. patent application Ser. No. 13/240,572, filed on Sep. 22, 2011, which is incorporated in its entirety here by this reference.

BACKGROUND

This description relates to security risk management.

Security risks faced by an entity, for example information security risks, often include security risks associated with other entities with which it communicates or collaborates. The first entity may evaluate the magnitude of the risks associated with the other entities to make decisions about its relationships with those other entities.

SUMMARY

The security risk management that we describe here may encompass one or more of the following (and other) aspects, features, and implementations, and combinations of them.

In general, in an aspect, traces are received of activities of an online user who is associated with an entity. By analysis of the traces a security state of the entity is inferred.

Implementations may include one or any combination of two or more of the following features. The traces indicate successful attacks on computer systems of the entity. Traces that represent a less satisfactory security state of the entity are differentiated from traces that represent a more satisfactory security state of the entity. The analysis includes a comparison of traces that originated in different contexts of the user's online activities.

The different contexts include different times. The traces that originated at one of the times reflect a user deletion relative to the traces that originated at an earlier time. The traces that originated at one of the times reflect a user deletion of malicious data or code relative to the traces at the earlier time.

The different contexts include a context the security of which is controlled by the entity and a context the security of which is at least partly uncontrolled by the entity. The controlled context includes a computer system or device made accessible by the entity to the user, and the partly uncontrolled context includes a computer system or device owned by the user.

The traces include tracking of an identity of an online user between the two different contexts. The tracking includes cookies associated with advertising directed to the online user.

The traces include indications of security checks made with respect to communications associated with the user. The security checks include indications of whether email messages conform to DomainKeys Identified Mail (DKIM) standards or the email domains conform to the Sender Policy Framework (SPF).

In general, in an aspect, a map is generated between (a) technical assets that contribute to security characteristics of respective entities and (b) the identities of the entities that are associated with the respective technical assets. At least part of the generating of the map is done automatically. A user can be engaged to assist in the generating of the map by presenting to the user through a user interface (a) data about the technical assets of entities and (b) an interactive tool for associating the technical assets with the identities of the entities.

Implementations may include one or any combination of two or more of the following features. The technical assets include network-related information. The network-related information includes at least one of Internet Protocol addresses, blocks of Internet Protocol addresses, mail server configurations, domain names, social media handles, third-party data hosting, Internet service providers, Domain Name System (DNS) services, Autonomous System numbers, and Border Gateway Protocol (BGP) advertisements. The activity of generating the map includes online discovery of information about the technical assets. The information about the technical assets is discovered from an Internet Assigned Numbers Authority or a Regional Internet Registry (RIR). The information about the technical assets is discovered through passive DNS queries. Associations between domain names and network addresses are identified from the passive DNS queries. Changes are tracked over time in the network addresses that are associated with a given domain name.

The activity of identifying associations between domain names and network addresses from the passive DNS queries includes one or a combination of any two or more of the following. A first domain name for an entity is received from the entities. A first passive DNS query is sent to identity first name servers for the first domain name. A list is received of the first name servers for the first domain. A second passive DNS query is sent, for each of the first name servers, to identify second domain names for which the name server is authoritative. A list is received, for each of the first name servers, of the second domain names for which the name server is authoritative. A third passive DNS query, for each of the second domain names, is sent to identify host names for the hosts of the second domain name and Internet Protocol addresses for the host names. A list is received of the host names and the Internet Protocol addresses for the host names. And each of the Internet Protocol addresses is mapped to an attribute for the entity.

Non-technical-asset information is presented to the user through the user interface. The non-technical-asset information includes information about the entities. The information about the entities includes at least one of descriptions of entities, industry classifications, and employee counts. The tool enables the user to assign a technical asset to an entity. External crowd-sourced services are invoked to aid in generating the map. A separate review and approval is done of entities proposed to be included in the map. The map is provided to an application for joining to event data or for scoring the security state of the entities. The part of the generating of the map that is done automatically includes at least one of collecting information about technical assets and about entities, associating technical assets with entities, and approving proposed portions of the map. Graphs of relationships among entities are generated based on their associations with technical assets. These and other aspects, features, and implementations, and combinations of them, may be expressed as apparatus, methods, methods of doing business, means or steps for performing functions, components, systems, program products, and in other ways.

The subject matter described in this specification can be implemented in particular embodiments so as to realize one or more of the following advantages. By understanding the nature and degree of security risks associated with other entities, an entity can evaluate, analyze, and reduce its own risk. In some implementations, analysis of traces of online activities of users may represent security policies or vulnerabilities of the entities that employ the users. In some implementations, analysis of traces of online activities may identify information associated with multiple entities more quickly, more accurately, and more privately than gathering data directly from the multiple entities. In some implementations, a map of technical and non-technical assets for an entity may be used to determine a security rating for the entity. In some implementations, technical data may be retrieved and mapped to an entity in a manner not previously available. In some implementations, the security risks of an entity may be analyzed or determined without involvement of the entity.

In some implementations, the use of automation in a data mapping process or a data approval process may reduce the likelihood of error in the mapping process. In some implementations, the use of an automated or semi-automated analysis process may allow automated maintenance of an entity map and may reduce the likelihood of errors in the entity map because of outdated data. In some implementations, an automated maintenance process is automatically initiated upon identification of changes in entity data. In some implementations, the use of an automated or semi-automated analysis process allows mapping of data to entity attributes for a greater number of entities in a shorter period of time than a completely manual analysis process.

In some implementations, the use of passive Domain Name System (DNS) data may identify network services that are hosted on shared hosting services. In some implementations, the identification of network services that are hosted on shared hosting services may indicate that an Internet Protocol address should not be associated with a single entity but should be associated with multiple entities. In some implementations, when the same data is mapped to attributes for different entities, e.g., when a single Internet Protocol address is associated with multiple entities, the security ratings of the different entities are related, e.g., based on the security ratings of the other entities that have the same attribute data. In some implementations, the use of the same shared hosting service by multiple entities indicates a less satisfactory security posture and the security ratings of the multiple entities are lower than if each of the multiple entities used separate hosting services.

Other aspects, features, and advantages will be apparent from the description and the claims.

DESCRIPTION

Figure 14:
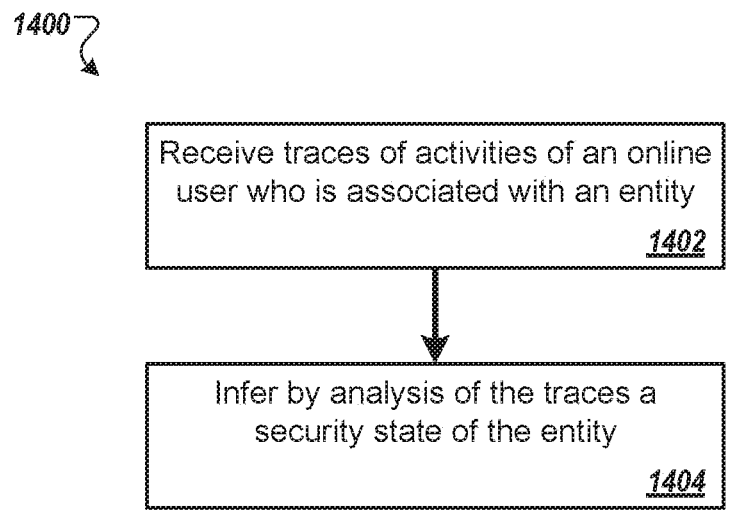
Figure 15:
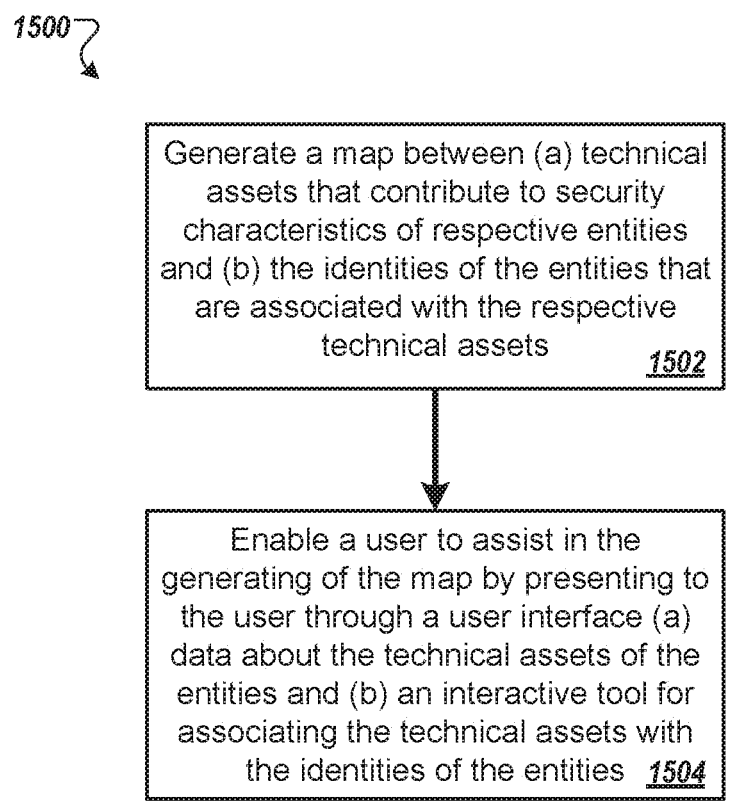
Figure 16:
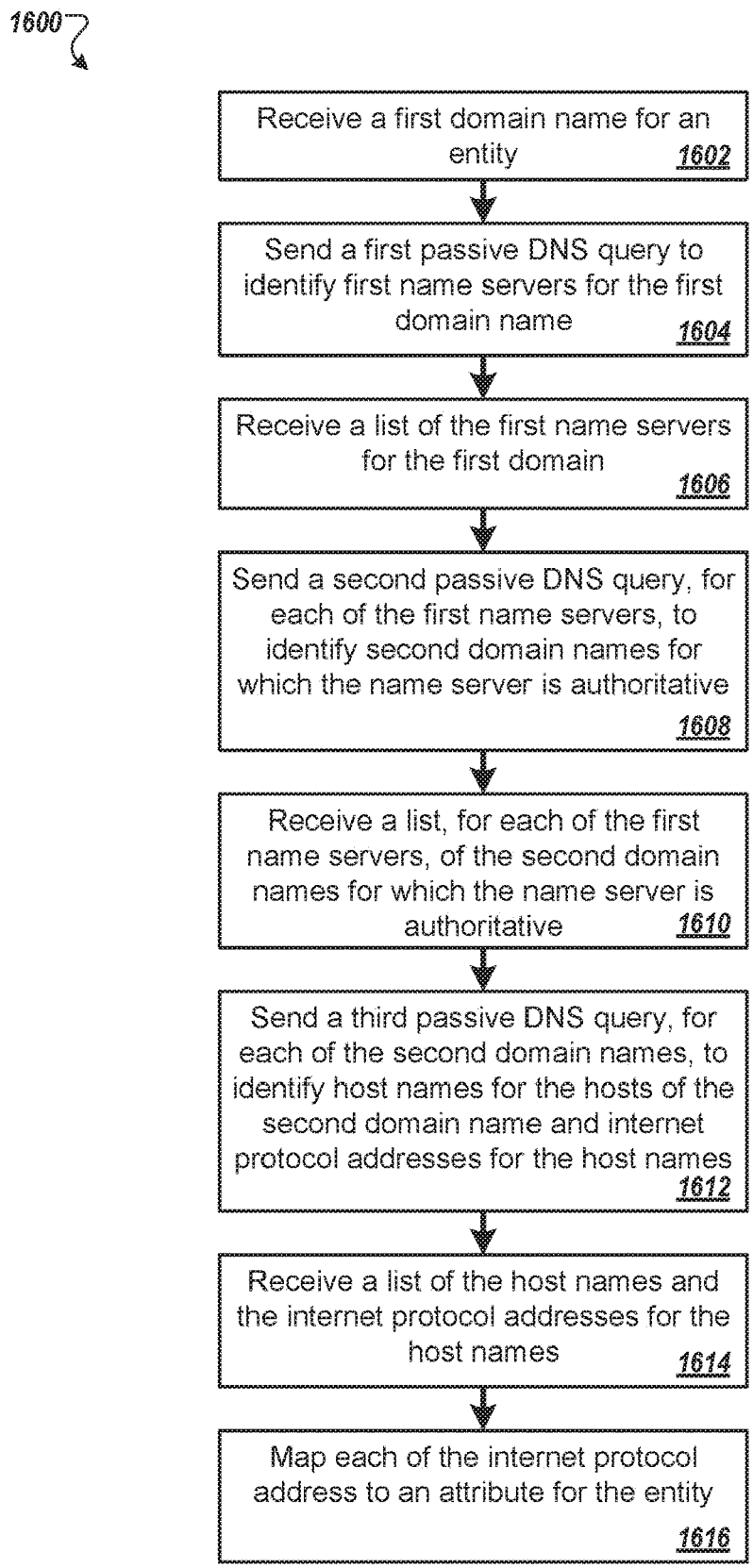

FIGS. 1-5, 13, and 17 are block diagrams.
FIGS. 6-12 are examples of user interfaces.
FIGS. 14-16 are flow diagrams.

In the system and techniques that we describe here, an entity may obtain and use security analysis data from an analysis system to determine its own security risk or the security risk associated with a different entity with which the entity may communicate or have a relationship involving sensitive or confidential information. Sometimes we refer to an "entity" or "entities" in our discussion; we mean this phrase broadly to include, for example, individuals or businesses that communicate electronically with other individuals or businesses and have electronic data. The information security analysis data may be used by an entity to identify potential areas of improvement for its own security risk or to decide that sensitive information should not be provided to another entity that is associated with unacceptable security vulnerabilities. We sometimes refer to "information security risk" in our discussion; we mean this phrase broadly to include, for example, any kind of security risk that may be evaluated using the system and techniques that we describe here.

The analysis system may receive and analyze technical and non-technical data or assets to determine a security rating of an entity. We use the term security rating in its broadest sense to include, for example, any kind of absolute or relative ranking, listing, scoring, description, or classification, or any combination of them, of an entity with respect to characteristics of its security state. For example, the analysis system may identify an entity associated with the received data, map the received data to attributes for the entity, such as contact information and the number of employees employed by the entity, and determine a security rating for the entity using the mapped data.

Some examples of received data may include traces of online activity associated with an entity. For example, the analysis system may analyze logs of online activity of employees of an entity or one or more settings of servers that host data for the entity to determine a security rating for the entity.

The online activity and the settings include data that is publicly or commercially available. For example, the online activity may include public interactions of employees with social networking systems, publicly available information associated with cookies stored on a device operated by an employee, or publicly available security settings for a mail server that hosts the entity's electronic mail. The publicly available data may be retrieved from a Domain Name Server or an industry intelligence company to name two examples.

FIG. 1 is a block diagram of an example environment 100 for assigning a security rating and a confidence score to an entity. The environment 100 includes a server 102 that receives data from data sources 104. The data sources 104 include technical data sources 106 and non-technical data sources 108, described in more detail below. (We sometimes refer to technical data as technical assets and to non-technical data as non-technical assets.)

The server 102 acquires and analyzes data from the technical data sources 106 and the non-technical data sources 108 to identify data associated with entities. For example, the server 102 selects a subset of the data received from the data sources 104, identifies the entity associated with the subset of the data, and maps a relationship between the subset of the data and the identified entity.

The server 102 stores some of the received data in a database 110. For example, the server 102 stores entity names 112, security ratings 114 for the entities identified by the entity names 112, and confidence scores 116 in the database 110, where each of the confidence scores 116 corresponds with one of the security ratings 114.

The confidence scores 116 may represent the confidence of a corresponding security rating, from the security ratings 114. For example, each of the confidence scores 116 may represent the confidence of the server 102 in the corresponding security rating. The server 102 may use any appropriate algorithm to determine the security ratings 114 and the corresponding confidence scores 116 or other values that represent a security rating of an entity.

An entity may use one of the security ratings 114 and the corresponding one of the confidence scores 116 to determine its own security rating or the security rating of another entity with which the entity may communicate. For example, if the entity has a poor security rating, the entity may determine steps necessary to improve its own security rating and the security of its data. The entity may improve its security to reduce the likelihood of a malicious third party gaining access to its data or creating spoofed data that is attributed to the entity or an employee of the entity.

In some examples, an entity may determine whether or not to communicate with another entity based on the other entity's security rating. Sometimes in our discussion we refer to the entity that is being rated as the "target entity" and the entity that is using the rating as the "at-risk entity". For example, if the target entity has a low security rating, the at-risk entity may determine that there is a greater likelihood that documents sent to the target entity may be accessed by a user who is not authorized to access the documents compared to documents sent to a different target entity that has a higher security rating.

The at-risk entity may compare the security ratings of two competitive target entities to determine the difference between the security ratings of the competitors and with which of the competitors the entity should communicate or engage in a transaction, based on the security ratings. For example, the at-risk entity may require a third party audit and select one of the two competitors for the audit based on the security ratings of the competitors, potentially in addition to other factors such as price, recommendations, etc.

In some implementations, the server 102 includes the database 110. For example, the database 110 is stored in a memory included in the server 102. In some implementations, the database 110 is stored in a memory on a device separate from the server 102. For example, a first computer may include the server 102 and a second, different computer may include the memory that stores the database 110. In some implementations, the database 110 may be distributed across multiple computers. For example, a portion of the database 110 may be stored on memory devices that are included in multiple computers.

In some implementations, the server 102 stores data received from the data sources 104 in memory. For example, the server 102 may store data received from the data sources 104 in the database 110 or in another database.

In some implementations, the security rating for an entity is associated with the security of electronic data of the entity. In some implementations, the security rating for an entity is associated with the security of electronic and non-electronic data of the entity.

Figure 2:
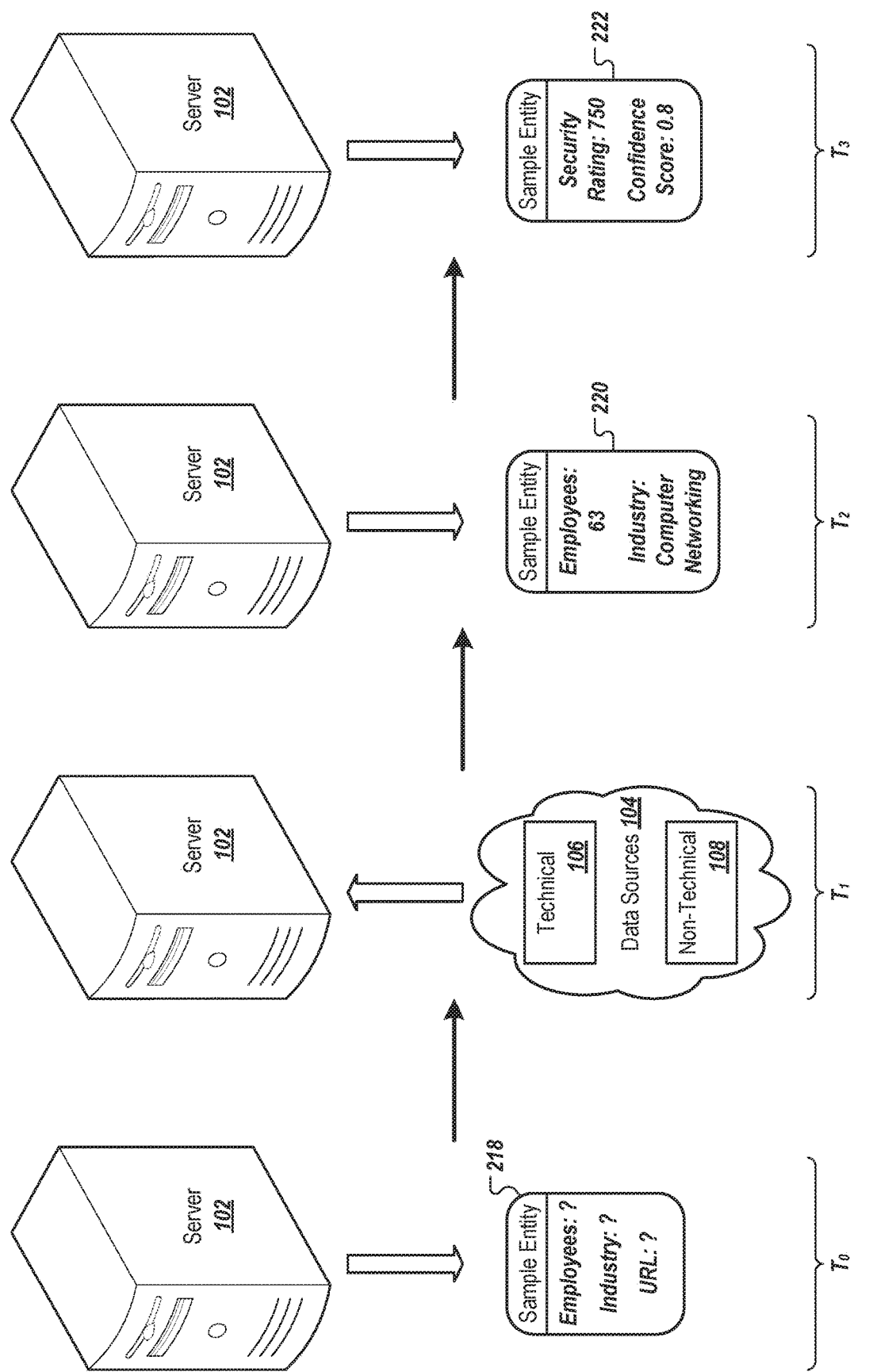

FIG. 2 is an example of an environment 200 that assigns a security rating and a confidence score to an entity. For example, during time $T_0$ the server 102 identifies an entity 218 (or the entity is identified by a user of the server), "Sample Entity," for which the server 102 will determine a security rating and a corresponding confidence score.

The server 102 may identify a target entity that is not currently assigned a security rating or an entity that was assigned a previous security rating. The server 102 may identify an entity that was assigned a previous security rating based on new or updated data for the entity or based on a request for an updated security rating, e.g., from an at-risk entity. In the example shown in FIG. 2, the server 102 has identified an entity that is not currently assigned a security rating.

During time $T_1$, the server 102 receives data from the data sources 104, including data for the identified entity. For example, the server 102 identifies a subset of the received data that is associated with the identified entity. The subset of the received data may be associated with the identified entity based on each of the distinct portions of the subset including the name of the identified entity, e.g., "Sample Entity," or a name or word associated with the identified entity, e.g., the name of a subsidiary, an acronym for the identified entity, or a stock symbol of the identified entity, among others.

The duration of the time period $T_1$ may be any length of time. For example, the time period $T_1$ may have a duration of seconds, minutes, or days. As other examples, the time period $T_1$ may be months or years long. Note that, although the time periods shown in FIG. 2 do not overlap, in some cases they can overlap for a given target entity and are likely to overlap for the application of the system to multiple target entities.

The server 102, during time $T_2$, maps the subset of tire received data that is associated with the identified entity to attributes 220 for the identified entity. For example, when the server 102 determines that the identified entity currently employs sixty-three employees, the server may assign the value of sixty-three to an "employees" attribute of the identified entity in the database. In some examples, the server 102 may determine one Or more industries for the identified entity, such as "Computer Networking." The industries may represent the type of products and/or services offered by the identified entity. Standard industry codes can be used for this purpose.

The duration of the time period $T_2$ may be any length of time. For example, the time period $T_2$ may have a duration of seconds, minutes, or days. As other examples, the time period $T_2$ may be months or years long.

In some implementations, as the server 102 receives portions of the subset of data, if the server determines that each of the portions is associated with the identified entity, the server 102 maps the received portions to the attributes 220 for the identified entity. For example, the server 102 may automatically map data to an "employees" attribute based on received data and then automatically map data to an "industry" attribute.

In some examples, the server 102 may update one or more of the attributes 220 as the server 102 receives additional data associated with the identified entity. For example, the server 102 may determine that the identified entity sells "computer networking products" and then determine that the identified entity also offers "computer networking services." The server 102 may associate the industry "computer networking products" with the identified entity first based on the data that indicates that the identified entity sells computer network products, then associate the industry "computer networking services" with the identified entity based on the data that indicates that the identified entity also offers computer networking services.

Based on the data mapped to the attributes 220 for the identified entity, the server 102 determines one or more scores 222 for the identified entity during time period $T_3$. For example, the server 102 determines a security rating and a corresponding confidence score for the identified entity "Sample Entity."

The server 102 may use some or all of the attributes 220 for the identified entity when determining the score 222 for the identified entity. For example, the server 102 may use an industry assigned to the identified entity as one factor to determine the security rating of the identified entity.

In some examples, the server 102 may determine weights for the attributes 220 where the weights represent the influence of the corresponding attribute on the security rating. For example, the number of employees employed by an entity may be assigned a greater weight than the industries of the products or services offered by the entity.

In some implementations, the weights may vary based on the values of the attributes. For example, when an entity has few employees, a weight corresponding to the number of employees may be smaller than if the entity had a greater number of employees.

The server 102 may provide the security rating and the corresponding confidence score of the identified entity to one or more other entities. For example, an at-risk entity may request the security rating and the corresponding confidence score for the identified target entity as part of a security analysis process for the identified target entity by the at-risk entity.

In some implementations, as mentioned earlier, one or more of the time periods $T_0$, $T_1$, $T_2$, and $T_3$ may overlap. For example, the server 102 may request data from the data sources 104, receive some of the requested data during time $T_1$, identify the entity 218 during time $T_0$, and then receive more of the requested data during time $T_1$. In some examples, the server 102 may map some of the requested data to the identified entity during time $T_2$ and while continuing to receive data from the data sources during time $T_1$. In some examples, the server 102 may determine the scores 222 for the identified entity during time $T_3$ while continuing to receive data from the data sources 104 during time $T_1$ and mapping the received data to the identified entity during time $T_2$.

In some implementations, the server 102 may identify the entity 218 based on a request for a security rating for the entity 218 from a third party. In some implementations, the server 102 may identify the entity 218 automatically. For example, the server 102 may determine that the server 102 has received more than a predetermined threshold quantity of data for the entity 218 and that the server 102 should analyze the data to determine the scores 222. In some implementations, an operator of the server 102 may identify the entity 218. For example, the operator may provide the server 102 with a list of entities for which the server 102 should determine the scores 222. In some examples, the list of entities may include a predetermined list of entities, such as Fortune 500 or Fortune 1000 companies.

Figure 3:
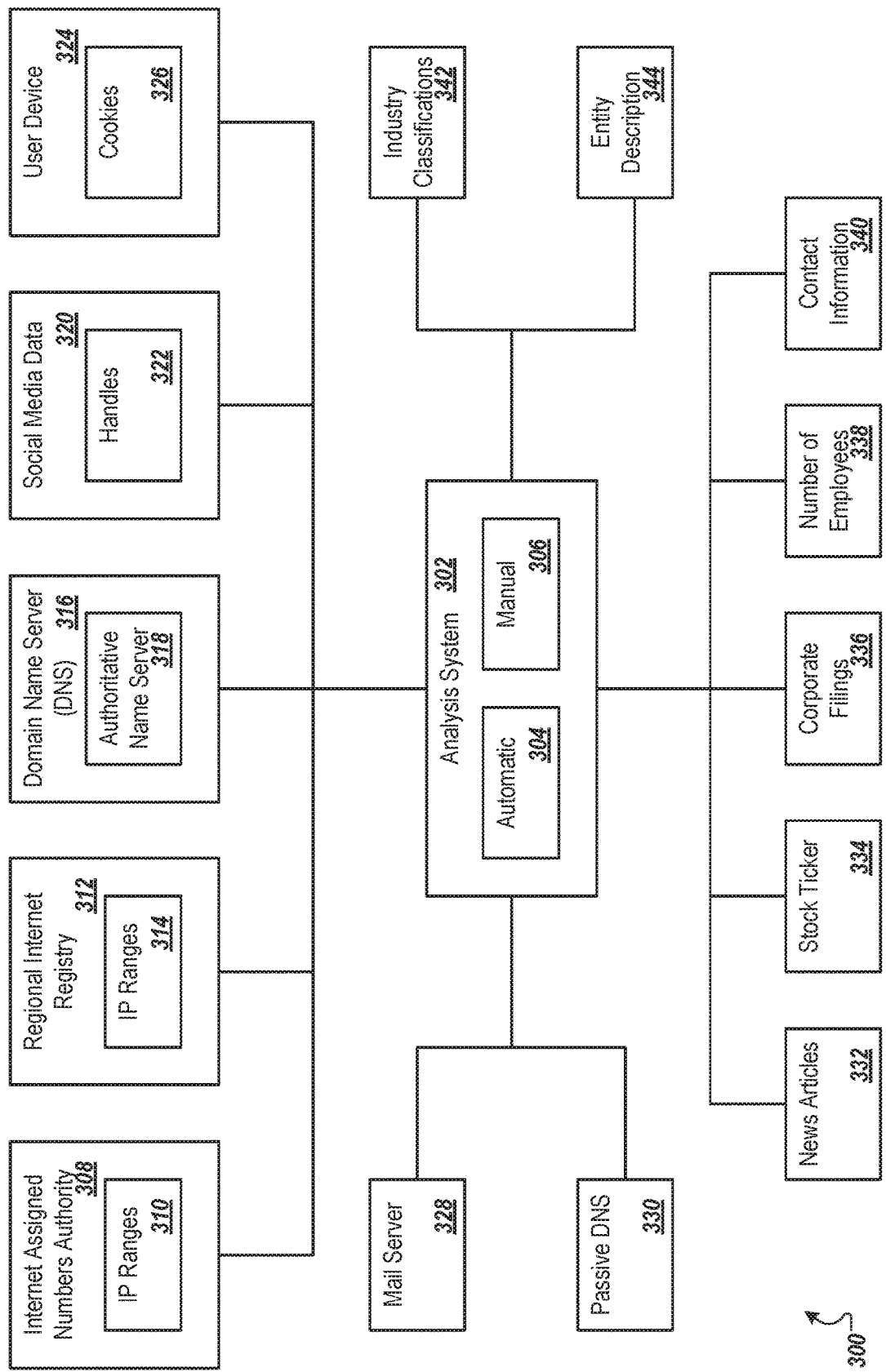

FIG. 3 is a block diagram of an example environment 300 of data sources for an analysis system 302. For example, the data sources may include technical and non-technical data sources. After the analysis system 302 receives data from one or more of the data sources, the analysis system 302 may perform an automatic analysis process 304, a manual analysis process 306, or a semi-automatic analysis process using the received data, or a combination of any two or more of those.

Non-technical data may be used manually to disambiguate between entities and determine relationships between entities. Non-technical data may be received automatically from public and commercial data sources.

The automatic analysis process 304 may include the analysis system 302 automatically identifying data associated with an entity based on data received from the data sources, without input or intervention from an operator, e.g., an operator of the analysis system 302. We sometimes refer to such an operator as a mapper. In some examples, the automatic analysis process 304 may include collecting data from the data sources and approving proposed portions of a mapping between data received from the data sources and attributes of an entity.

The manual analysis process 306 may include presentation of data to an operator of the analysis system 302, e.g., a computer executing the analysis system 302, where the operator maps associations between the received data and one or more entities.

The semi-automatic analysis process may include a combination of the automatic analysis process 304 and the manual analysis process 306. For example, the automatic analysis process 304 may map some of the received data to an entity and present information associated with the mapping to an operator for approval. In addition, the operator may acquire and review received data, and manually map data to a target entity.

The environment 300 includes an Internet Assigned Numbers Authority 308 (IANA) as one of the technical data sources. The analysis system 302 may request data from the Internet Assigned Numbers Authority 308 to determine an Internet Protocol (IP) address range 310 associated with an entity. For example, the analysis system 302 may determine a domain name for a website of an entity and provide the domain name to a Domain Name Server 316. In response the analysis system 302 may receive the Internet Protocol address of the website from the Domain Name Server 316, e.g., the Internet Protocol address assigned to the domain name, and provide the Internet Protocol address to the Internet Assigned Numbers Authority 308. The Internet Assigned Numbers Authority 308 may then provide the analysis system 302 with an Internet Protocol address range that includes the Internet Protocol address that was provided to the Internet Assigned Numbers Authority 308.

Similarly, the analysis system 302 may query a Regional Internet Registry 312 for one or more Internet Protocol address ranges 314. For example, the analysis system 302 may provide an Internet Protocol address to the African Network Information Centre (AfriNIC), the American Registry for Internet Numbers (ARIN), the Asia-Pacific Network for Information Centre (APNIC), the Latin America and Caribbean Network Information Centre (LACNIC), or Réseaux IP Européens Network Coordination Centre (RIPE NCC) and receive the Internet Protocol address ranges 314 in response to the query.

The Internet Protocol address ranges 310 and the Internet Protocol address ranges 314 may include one or more Internet Protocol addresses. For example, when a single Internet Protocol address is assigned to a domain name, the Internet Protocol address ranges 310 or the Internet Protocol address ranges 314 may include only the single Internet Protocol address.

In some examples, one or both of the Internet Protocol address ranges 310 and 314 may include multiple ranges. For example, when the Internet Assigned Numbers Authority 308 or the Regional Internet Registry 312 receive multiple domain names, the Internet Protocol address ranges 310 or 314 may include multiple ranges of Internet Protocol address, where each range corresponds to at least one of the multiple domain names.

In some implementations, the Domain Name Server 316 may be an authoritative name server 318. For example, the authoritative name server 318 may be responsible for mapping. Internet Protocol addresses to one or more particular domain names.

In some implementations, a passive. Domain Name Server 330 may receive passive DNS queries from the analysis system 302. For example, the passive Domain Name Server 330 may be hosted on a different computer than the Domain Name Server 316. In some examples, the passive Domain Name Server 330 is hosted on the same computer or computers as the Domain Name Server 316.

The passive Domain Name Server 330 may include a cache of previous DNS queries and results for the previous DNS queries. In some examples, the passive Domain Name Server 330 may include historical data that indicates a specific date that an Internet Protocol address was associated with a specific domain name.

The analysis system 302 may query the passive Domain Name Server 330 to determine domain names that were associated with specific Internet Protocol addresses, the dates that the domain names were associated with the specific Internet Protocol addresses, and any changes in the Internet Protocol addresses that were assigned to a domain name. This may allow the analysis system 302 to determine other domain names that were associated with the same Internet Protocol addresses at the same time, and other Internet Protocol addresses associated with domain names, to name a few examples.

For example, the analysis system 302 may receive data from the passive Domain Name Server 330 that indicates whether or not a single Internet Protocol address is associated with multiple domain names. In some examples, the analysis system 302 may determine that a single server or group of servers hog multiple websites when multiple domain names were associated with a single Internet Protocol address.

In some implementations, when a single server or group of servers host multiple websites, the entities associated with the websites hosted by a single server or group of servers may be assigned a lower security rating than if an entity had a dedicated server for its website. For example, when an entity uses a cloud based server to host the entity's website, the use of the cloud based server may indicate that the entity is more susceptible to information based attacks than if the entity used a server that only hosted the entity's website.

The analysis system 302 may receive social media data 320 from social media networks. For example, the analysis system 302 may monitor or subscribe to a social media network and store the social media data 320 in a memory, e.g., of a computer that executes the analysis system 302 or another computer. The analysis system 302 may identify one or more handles 322 in the social media data 320 that are associated with one or more entities. The analysis system 302 may use the handles 322 to identify data associated with the entities and determine one or more security attributes for the entities based on the social media data 320 as described in more detail below.

The analysis system 302 may receive trace information associated with a user device 324 that represents online activity of the user device 324. The trace information may be used by the analysis system 302 to determine one or more security policies of an entity or entities that employ an operator of the user device 324. For example, the analysis system 302 may receive a data about one or more cookies 326 stored in a memory of the user device 324, as described in more detail below, and determine that an entity allows employees to access confidential data using devices owned by the employees.

A mail server 328 may provide the analysis system 302 with information about one or more security settings for the email communications of an entity. For example, the analysis system 302 may determine whether the mail server 328 uses Sender Policy Framework (SPF) and/or DomainKeys Identified Mail (DKIM) for electronic mail communications.

In some implementations, when an entity does not use one or both of SPF and DKIM, the analysis system 302 assigns the entity a lower security rating than if the entity used one or both validation methods. For example, a first entity that uses both SPF and DKIM may have a higher security rating than a second entity that only uses SPF, assuming that all other attributes for the first and second entities are the same. In some examples, the analysis system 302 may determine whether the mail server 328 uses one or more validation methods other than SPF or DKIM.

The environment 300 includes one or more news articles 332 as one of the sources of non-technical data. The news articles 332 may provide the analysis system 302 with contact information, one or more industry classifications, and an entity description. In some examples, the news articles 332 may provide the analysis system 302 with technical data, such as data about a recent security breach at an entity.

In some implementations, the news articles 332 may include information about corporate relationships between entities. For example, the news articles 332 may indicate that an entity may be purchased by Another entity or is a subsidiary of another entity.

The analysis system 302 may use the corporate relationship information or data about a recent security breach when determining a security rating for an entity. For example, when an entity is a Subsidiary of another entity with a low security rating, the entity may be assigned a lower security rating than if the entity was not a subsidiary of the other entity. In some examples, an entity is assigned a lower security rating based on a news article about a recent security breach compared to another entity that does not have a recent news article about any security breaches, assuming all other attributes of both entities are equal.

A stock ticker 334 for an entity may be used by the analysis system 302 to determine financial information about an entity or data associated with the stock ticker but not the entity name. For example, the analysis system 302 may identify data associated with the entity based on the entity's stock ticker that would not otherwise have been identified.

One or more corporate filings 336 may be used to determine data about an entity, such as one or more subsidiaries or affiliates of the entity, and/or contact information of the entity.

In some examples, the analysis system 302 may determine an aggregate security rating for an entity and the entity's subsidiaries based on a relationship between the entity And the entity's subsidiaries. For example, if the entity does not have any influence over the entity's subsidiaries, the analysis system 302 may determine that an aggregate security rating would not be representative of the relationship between the entity and the entity's subsidiaries. In some examples, when the entity and the entity's subsidiaries share one or more physical places of business, the analysis system 302 may determine that an aggregate security rating for the entity and the entity's subsidiaries more accurately reflects the data security of the entity and the entity's subsidiaries.

The analysis system 302 may receive a number of employees 338 and contact information 340 for an entity. In some implementations, the analysis system 302 determines a security rating for an entity based on the number of employees 338 and/or the contact information 340. For example, the analysis system 302 may determine that the physical location of an entity is in an area of low crime and associate the entity with a higher security rating than if the entity was physically located in a location or locations of higher crime.

One or more industry classifications 342 for an entity may be used by the analysis system 302 to determine other entities that operate in the same field as the entity. For example, the analysis system 302 may use the industry classifications 342 and/or information about the other entities that operate in the same field when determining a security rating for the entity.

An entity description 344 may be received from a data source such as the entity's website, a news article, or a corporate filing, to name a few examples. The entity description 344 may be used by the analysis system 302 to provide a user with information about an entity. For example, an operator of the analysis system 302 may use the entity description 344 during the manual analysis process 306 to determine whether data identified as potentially associated with an entity is actually associated with the entity. In some examples, the operator may determine that received data is associated with a different industry classification or not related to the entity description 344 and should not be mapped to an attribute of an entity.

In some implementations, the Internet Assigned Numbers Authority 308, the Regional Internet Registry 312, the Domain Name Server 316, the social media data 320, the user device 324, the mail server 328, and the passive Domain Name Server 330 are all sources of technical data. For example, the sources of technical data include data about computer systems and/or computer activities associated with entities.

One or more of the sources of technical data may provide the analysis system 302 with trace data. For example, one of the sources of technical data, such as the social media data 320, may provide the analysis system 302 with data that represent online activities associated with an entity.

In some implementations, the trace data represent online activities but do not include the actual content of the online activities. For example, when a user posts data on a social media network, the analysis system 302 may receive information about the date and time of the post but not the actual content of the post.

In some implementations, the news articles 332, the stock ticker 334, the corporate filings 336, the number of employees 338, the contact information 340, the industry classification 342, and the entity description 344 are all sources of non-technical data.

In some implementations, a single source of data may provide the analysis system 302 with both technical and non-technical data. For example, the Regional Internet Registry 312 may provide the analysis system 302 with the Internet Protocol address ranges 314 and the contact information 340.

In some implementations, a single source of data may provide the analysis system 302 with multiple different types of data. For example, the corporate filings 336 may provide the analysis system 302 with the number of employees 338, the contact information 340, and one or more domain names.

In some implementations, the automatic analysis process 304 or the semi-automatic analysis process acquire Regional Internet Registry registration data, Autonomous System numbers, Internet Protocol address blocks, and Border Gateway Protocol advertisements in an automated fashion. For example, the automatic analysis process 304 or the semi-automatic analysis process may add Regional Internet Registry registration data, Autonomous System numbers, Internet Protocol address blocks, and Border Gateway Protocol advertisements to a mapping of data to entity attributes. In, some examples, the automatic analysis process 304 or the semi-automatic analysis process includes a rule-based system that is used to determine which data to include in an entity map and which data to discard. In some examples, the semi-automatic analysis process may require human interaction for the mapping of the Regional Internet Registry registration data, Autonomous System numbers, Internet Protocol address blocks, and Border Gateway Protocol advertisements to one or more entity attributes.

In some implementations, the environment includes an Autonomous System assigned to an entity. For example, the analysis system 302 may identify an Autonomous System based on the Internet Protocol address ranges 310 or 314. The Autonomous System may broadcast the Internet Protocol addresses that the Autonomous System owns, controls, or to which the Autonomous System has routes.

The analysis system 302 may infer relationships between entities based on the Autonomous System. For example, the analysis system 302 may identify a route between an Autonomous System and an Internet Protocol address for another Autonomous System and infer a relationship between the entity that controls the Autonomous System and another entity that controls the other Autonomous System.

In some examples, when a first Internet Protocol address and a second Internet Protocol address are both assigned to the same Autonomous System and are associated with a first domain and a second domain, respectively, the analysis system 302 may determine that there is a relationship between a first entity that controls the first domain and a second entity that controls the second domain. For example, the analysis system 302 may determine that both entities use a shared hosting service.

In some implementations, the analysis system 302 may use Border Gateway Protocol (BGP) data to determine the Internet Protocol addresses that an entity uses. For example, the analysis system 302 may receive a BGP advertisement that identifies an Internet Protocol address for an Autonomous System and indicates that the Internet Protocol address is currently in use by the entity. The analysis system 302 may use the Internet Protocol use data to determine which Internet Protocol addresses an entity is actively using and which Internet Protocol addresses assigned to the entity are not in use. The analysis system 302 may determine the security rating for the entity based on the Internet Protocol addresses the entity is using.

In some implementations, the analysis system 302 may update an entity mapping on a daily basis, or in some cases more or less frequently than daily. For example, the analysis system 302 may determine that some data associated with an entity changes at least every day and that the mapping for the entity should be updated accordingly. In some examples, BGP advertisements for a particular entity change on a daily basis and represent changes in entity data, e.g., technical data. For example, the analysis system 302 may receive a first BGP advertisement containing first data and later receive a second BGP advertisement that contains second data which indicates a change to the first data. The analysis system 302 may use the changes in the entity mapping, such as the changes to the entity's BGP advertisements, when determining a security rating for the entity.

In some implementations, the automatic analysis process 304 or the semi-automatic analysis process may approve a mapping for an entity. For example, the automatic analysis process 304 may approve an entity mapping by comparing similar data obtained through two separate data sources, evaluating the data to determine a similarity score that represents the similarity of the data, and comparing the similarity score to a predetermined similarity threshold. For example, an Internet Protocol address block obtained from a Border Gateway Protocol advertisement may be compared to its corresponding Regional Internet Registry registration to determine the similarity between the Internet Protocol address blocks and any data associated with the Internet Protocol address blocks.

In some examples, when the similarity score is greater than the predetermined similarity threshold, the automatic analysis process 304 or the semi-automatic analysis process automatically approve the mapping of the Internet Protocol address blocks. In some examples, when the similarity score is not greater titan the predetermined similarity threshold, the automatic analysis process 304 or the semi-automatic analysis process do not approve the mapping of the Internet Protocol address blocks.

Figure 4:
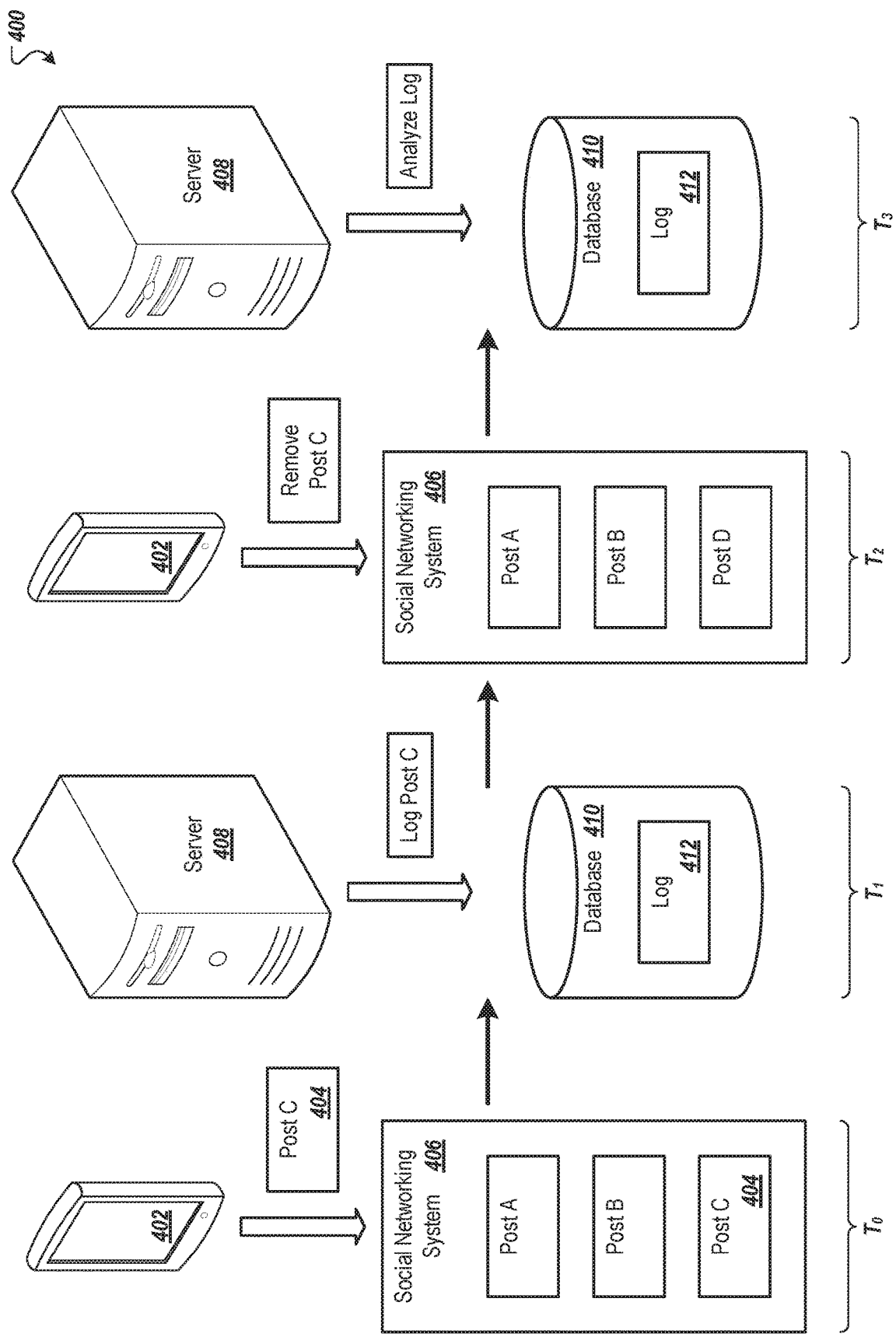

FIG. 4 is an example of an environment 400 identifying a removal of social media data from a social media network. During time $T_0$, a user device 402 sends a post C 404 to a social networking system 406. For example, the social networking system 406 places the post C 404 on a webpage associated with an operator of the user device 402 or provides the post C 404 to one or more users that receive content posted to the social networking system 406 by the operator of the user device 402.

A server 408, during time $T_1$, logs data associated with the post C 404. For example, the server 408 stores a record in a database 410 where the record indicates that the operator placed the post C 404 on the social networking system 406 at a specific time.

In some implementations, the database 410 includes a log 412 associated with the operator of the user device 402. For example, the database 410 includes a log for each employee of an entity. In some examples, the database 410 includes a log for each entity, where a single log includes records for the online activities of all employees employed by a single entity. In some examples, the log 412 includes records for an entity and all of the entity's subsidiaries. In some implementations, the database 410 includes a single log 412.

The time period $T_1$ may occur immediately after the time period $T_0$. In some implementations, the time period $T_1$ occurs according to a schedule. For example, the server 408 may log the online activity of the user device 402 once a day at a predetermined time. In some examples, the server 408 logs multiple activities during the time period $T_1$. For example, when the server 408 logs the online activity of the user device 402 once a day the server 408 may identify multiple activities, such as social media posts, blog posts, and/or forum posts, and record all of the multiple activities in the database 410 during the time period $T_1$.

The operator of the user device 402, during time $T_2$, removes the post C 404 from the social networking system 406; and, during time $T_3$, the server 408 logs the removal of the post C 404 and analyzes the log 412. For example, the server 408 analyzes the social networking system 406 during time $T_3$ and determines that the post C 404 is no longer on the social networking system 406 and that the operator of the user device 402 likely removed the post C 404.

The server 408 may record the removal of the post C 404 to identify which posts or online activity included in the log 412 have changed. For example, when the server 408 determines that a large quantity of posts associated with the operator of the user device 402 have been removed from the social networking system 406, the server 408 may determine that the operator's social networking account may have been compromised.

The server 408 may determine, based on the social media accounts of employees employed by an entity, a security rating of the entity. For example, the security rating of the entity may be lower when the server 408 determines that a social media account of an employee of the entity was compromised than if the server 408 determined that no social media accounts for employees of the entity were compromised.

In some implementations, the server 408 monitors the social media accounts of employees of an entity that make statements on behalf of the entity. For example, the server 408 may monitor the social media accounts of public relations employees. In some examples, when the user posts information online on behalf of the entity and a social media account of the user is compromised, the server 408 may determine that the entity has a lower security rating than if the user's social media account was not compromised.

In some examples, when the server 408 determines that the post C 404 is substantially identical to the post B, the server 408 determines that the operator of the user device 402 may have posted the same content to the social networking system 406 on accident and determine based on the removal of the post C 404 that the likelihood that operator's social networking account was compromised is low.

In some implementations, the server 408 monitors one or more webpages of an entity. The server 408 may determine whether changes to the webpages were made maliciously or otherwise indicate a potential security vulnerability of the entity. Upon determining that a change to a webpage of the entity indicates a potential security vulnerability of the entity, the server 408 may assign the entity a lower security rating than the entity may have otherwise been assigned.

In some implementations, one or more of the time periods $T_0$, $T_1$, $T_2$, and $T_3$ may overlap. For example, the server 408 may log a post B in the database 410 while the user device 402 provides the post C 404 to the social networking system 406. In some examples, the user device 402 may remove the post C 404 from the social networking system 406 while the server 408 logs the post C 404 and/or while the server 408 analyzes the log 412. In some examples, the server 408 may log the post C 404 while the server 408 is analyzing data previously recorded in the log 412.

The duration of the time periods $T_0$, $T_1$, $T_2$, and $T_3$ may be any length of time. For example, the time period $T_1$ may have a duration of seconds, minutes, or days. As other examples, the time period $T_1$ may be months or years long.

Figure 5:
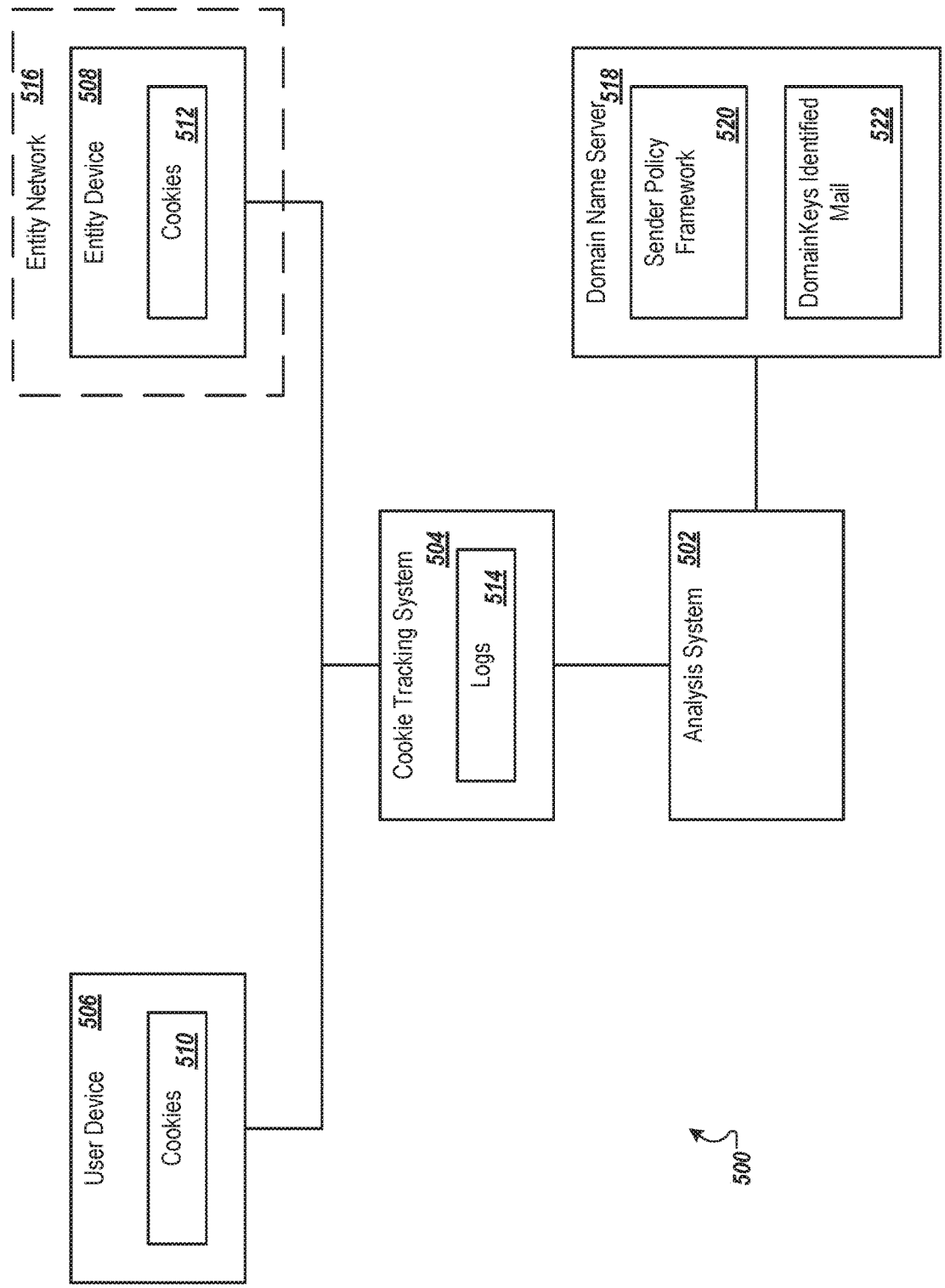

FIG. 5 is a block diagram of an example environment 500 of an analysis system 502 receiving traces of activities of an online user who is associated with an entity. For example, a cookie tracking system 504 may provide a user device 506 and an entity device 508 with cookies 510 and 512, respectively, and may record information about the cookies 510 and 512 in one or more logs 514. In some examples, the logs 514 may include an IP address of the user device 506 when the user device accesses content, such as an advertisement or a website.

The analysis system 502 may receive a portion of the logs 514, such as data indicating that the user device 506 accessed a particular website from a first IP address, e.g., based on a cookie associated with an advertisement, and that the user device 506 accessed the same particular website from a second IP address. In some implementations, the data does not include any identification information of the particular user device.

The analysis system 502 may determine that either the first IP address or the second IP address are associated with an entity, e.g., based on an assignment of a block of IP address including the first or second IP address to the entity, that the other IP address is not associated with the entity, and that the entity has a "bring your own device" policy that allows employees of the entity to access an entity network 516 with their own devices, e.g., the user device 506.

In some implementations, the analysis system 502 determines that the entity device 508 is a portable device, e.g., a laptop or a tablet, by identifying a first IP address associated with the cookies 512 that is also associated with an entity and a second IP address associated with the cookies 512 that is not associated with the entity. In some implementations, the analysis system 502 is unable to differentiate between a "bring your own device" such as the user device 506 and the entity device 508 when an operator of the entity device 508 may connect the entity device 508 to a network other than the entity network 516.

The analysis system 502 may use network policy information of an entity to determine a security rating for the entity. For example, the analysis system 502 may use a determination whether the entity has a "bring your own device" policy or allows employees to bring the entity device 508 home when calculating a security rating for the entity.

In some implementations, the analysis system 502 may determine whether the user device 506 or the entity device 508 are not fully secure, e.g., based on potentially malicious activities of the user device 506 or the entity device 508, and about which the operator of the device likely does not know. For example, the analysis system 502 may determine that the user device 506 was recently infected with malware and that the entity is not enforcing sufficient security policies on devices that can access the entity network 516, and assign the entity a lower security rating.

In some implementations, the analysis system 502 uses the logs 514 to determine whether an entity enforces the use of a virtual private network (VPN) on a device when the device requests access to the entity's resources. For example, the analysis system 502 may determine whether the user device 506 and/or the entity device 508 have an always on or nearly always on VPN policy for access to the entity's resources and determine the entity's security rating accordingly. In some examples, when the analysis system 502 determines that the user device 506 or the entity device 508 have an always on or nearly always on VPN policy, the analysis system 502 assigns the entity a higher security rating than if the entity did not enforce the always on or nearly always on VPN policy.

In some implementations, the analysis system 502 receives information from a Domain Name Server 518 or a passive Domain Name Server that indicates whether a mail server that hosts an entity's electronic mail enforces one or more email validation methods. For example, the analysis system 502 may query the Domain Name Server 518 or a passive Domain Name Server to determine whether email sent from the mail server includes malicious mail, e.g., spam, whether an email with a sender address that includes a domain of the entity complies with a Sender Policy Framework 520, e.g., is sent from an authorized computer, and whether an email includes a signature that complies with DomainKeys Identified Mail 522.

The analysis system 502 may determine a security rating for an entity based on the validation methods used by the mail servers of the entity. For example, when the entity uses one or more non-duplicative validation methods, the entity may be assigned a higher security rating.

FIG. 6 is an example of a user interface 600 for creating a backlog request that indicates an entity that requires a mapping of data to attributes of the entity. For example, an employee of an entity analysis company may enter an entity name 602, and a uniform resource locator 604 to request that an analysis system determine a mapping of data to attributes of the entity. The analysis system may use the mapped data when determining a security rating for the entity. The entity name 602 and uniform resource locator 604 may be a best guess by a requestor regarding the legal name of the entity and the domain name of the entity's website.

The user interface 600 includes a requested by field 606 and a priority field 608 that indicate a requested completion date and priority ranking, respectively. For example, a request system may automatically populate the requested by field 606, e.g., with a date a predetermined time in the future, such as one month, and the priority field 608, e.g., with a medium priority. The requestor that is interacting with the user interface 600 may adjust either the requested by field 606 or the priority field 608 based on the requirements of the request. For example, a high priority backlog request with the same requested by date as a medium or low priority backlog request would receive a higher priority, e.g., would be worked on first, compared to the medium or low priority backlog request.

A state field 610 may indicate the current state of the backlog request. For example, the state field 610 may indicate that the backlog request is currently being entered into the analysis system and has not been actively worked on, e.g., based on a "pending" state. A "mapping in progress" state may indicate that an analysis system is mapping data to attributes for the entity with an automatic, semi-automatic, or manual mapping process.

A customer name field 612 may indicate the name of the customer that has requested a security rating of the entity. For example, the customer may be another entity or the entity analysis company, e.g., when the entity analysis company determines the security ratings of one or more entities prior to a request from a customer.

A requestor field 614, an assigned to field 616, and an approver field 618 may be automatically populated by the request system. For example, the requestor field 614 may include the name or email address of the employee interacting with the user interface 600. The employee may adjust the information in the requestor field 614, for example, when the employee is preparing the backlog request on behalf of another employee of the entity analysis company.

The user interface 600 includes a comments field 620 that allows the requestor to include one or more comments with a backlog request. For example, the requestor may include additional information about the entity in the comments field 620 and/or other information associated with the backlog request.

FIG. 7 is an example of a user interface 700 for viewing a list 702 of backlog requests. For example, an employee of the entity analysis company may interact with the user interface 700 to identify one or more backlog requests and the state of the backlog requests.

The list 702 of backlog requests may include information for each of the backlog requests, such as some of the information included in the user interface 600. In some implementations, the list 702 includes a backlog initiation date that indicates the date a requestor created the backlog request. In some implementations, the list 702 includes a last updated date that indicates the most recent date for which the state of the backlog request changed. For example, the last updated date for a pending backlog request would be the date on which the backlog request was created. In some examples, when an analysis system begins to map data to attributes for an entity identified in a backlog request and the state of the backlog request changes from "pending" to "mapping in progress," the last updated date would indicate the date the mapping process began.

The user interface 700 allows an employee of the entity analysis company to sort the list 702 of backlog requests, e.g., by a "state" or an "assigned to" field, to search for backlog requests associated with a particular search string, and to view all backlog requests according to a state filter 704, using an assigned to filter 706, or using an approver filter 708. For example, a first employee that maps data to the attributes of an entity may use the assigned to filter 706 to identify all of the backlog requests assigned to the first employee. In some examples, a second employee that approves the data mapping to the attributes of an entity after the mapping process is completed may use the approver filter 708 to identify all of the backlog requests that are waiting for approval and are assigned to the second employee.

The user interface 700 includes an add backlog option 710 that upon selection presents the user interface 600 and a clear filters option 712 that upon selection removes selection of all of the filters 704, 706, and 708, e.g., by setting the filters to the "all" selection, and that removes any filters associated with search strings.

An unapproved items option 714 upon selection allows the employee of the entity analysis company to view all backlog requests in the list 702 that have not been approved. In some implementations, selection of the unapproved items option 714 presents backlog requests that are not approved, are not duplicate requests, and are not unmappable in the list 702. For example, a backlog request that is unmappable may be a backlog request for an entity for which the analysis system does not have enough data to complete a map for the attributes of the entity. For example, the analysis system may have a predetermined threshold, e.g., a minimum requirement, for the quantity of attributes that require data for a backlog request to be mappable. In some examples, when the mapping process is semi-automatic or manual, a first person that is performing the mapping process, e.g., assigned to the mapping process, or a second person that is performing the approval process may determine that there is insufficient data for an entity and indicate that the associated backlog request is unmappable.

FIG. 8 is an example of a user interface 800 for updating a backlog for an entity. For example, an employee of an entity analysis company may interact with the user interface 800 to map data to attributes of the entity, e.g., by selecting a start mapping option 802, to approve the map of data to attributes of the entity, e.g., by selecting a start approval option, and/or to view comments associated with the backlog.

Figure 9:
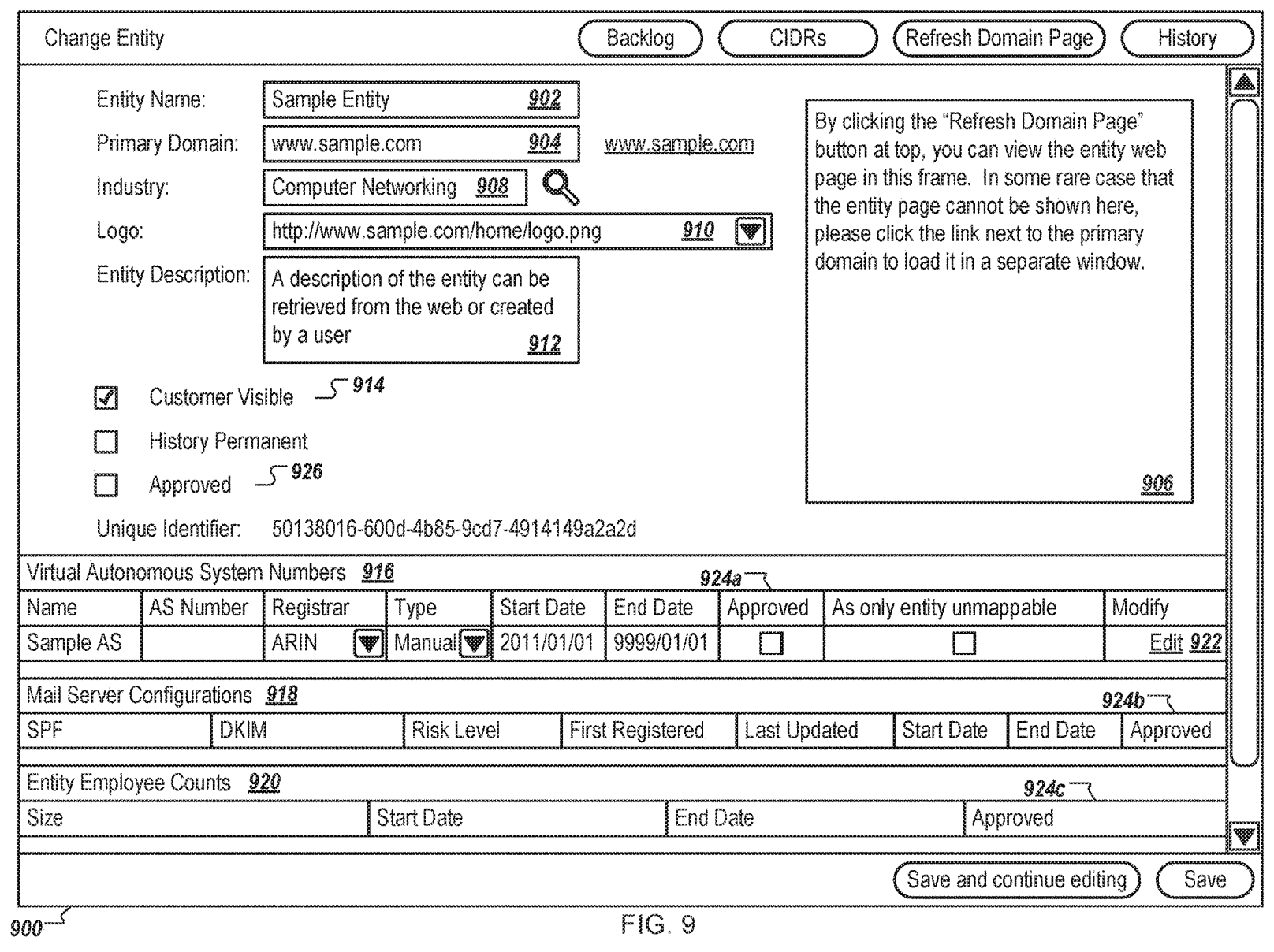

For example, when a state 804 of the backlog request is "pending," the top right portion of the user interface 800 includes the start mapping option 802 that upon selection presents a user with another user interface, e.g., a user interface 900 shown in FIG. 9, that allows the user to map data to attributes of the entity associated with the backlog request.

After the user has begun the mapping process, the state 804 of the backlog request may change to "mapping in process" and the user interface elements in the user interface 800 may change. For example, the start mapping option 802 may change to a continue mapping option.

In some examples, once the mapping process has begun, the user interface 800 may include a finalize entity option and a reject backlog option. For example, user selection of the finalize entity option may move the backlog request toward the approval process, e.g., by changing the state 804 of the backlog request to "finalize entity." In some examples, the finalize entity option may not be active until a predetermined threshold of attributes for the entity have been mapped to data.

In some implementations, once the mapping process has begun, the user interface 800 includes a reject backlog option. A user may select the reject backlog option to indicate that the analysis system has insufficient data for the mapping process or to otherwise indicate that the backlog request cannot be completed.

When the state 804 of the backlog request is "finalize entity," the User interface 800 may include a submit for approval option instead of or in addition to the start mapping option 802 and the finalize entity option. Selection of the submit for approval option may change the state 804 of the backlog request to "waiting for approval" and indicate that the employee has completed the mapping process.

In some implementations, when the state of a backlog is "waiting for approval" and a second employee selects a backlog request, e.g., in the user interface 700, the user interface 800 includes a start approval option in the upper right corner, e.g., instead of the start mapping option 802. The analysis system may include user verification to ensure that only an authorized approver may select the start approval option, e.g., based on the credentials of the second employee and/or a verification that the second employee is the employee identified by the approver field.

Upon selection of the start approval option, the State of the backlog request may change to "approval in progress" and the user interface 800 may include a finish approval to option and a reject option. Selection of the finish approval option may change the state of the backlog request to "approved," indicating that the data mapped to the attributes of the entity is as accurate as possible and that the analysis system may use the mapped data to determine a security rating and a corresponding confidence level for the entity.

In some implementations, once a backlog request is approved, the backlog request is removed from the list 702 shown in FIG. 7. For example, the list 702 may include only backlog requests that are active and does not include backlog requests that have been approved.

In some implementations, when the list 702 includes backlog requests that have been approved, an employee of the entity analysis company may select a completed backlog request to view the user interface 800. In these implementations, the user interface 800 shown in FIG. 8 includes a needs maintenance option in the upper right, e.g., instead of the start mapping option 802. Select of the needs maintenance option indicates that there may be new data available that can be mapped to attributes of the entity for which the backlog request was made or a decision was otherwise made to verify that the data mapped to the attributes of the entity is current.

In some implementations, the analysis system automatically identifies backlog requests that need maintenance. For example, the analysis system may perform maintenance on backlog requests according to a schedule, e.g., weekly, monthly, quarterly, semi-annually, annually, etc. The schedule may be particular tea specific backlog request, e.g., for the "Sample Entity," or for a group of backlog requests, e.g., that were all approved during a predetermined period of time, such as a particular week or month.

In some examples, the analysis system automatically determines that data is available for an updated mapping. For example, the analysis system may determine that particular data is available, e.g., based on a news article, and that the mapping of data to attributes of the entity should be updated. In some examples, the analysis system may determine that a predetermined threshold quantity of new data for the entity has been identified and that the mapping should be updated. The analysis system may use any appropriate algorithm to determine that the mapping for an entity should be updated.

Upon selection of the needs maintenance option or a determination by the analysis system that a backlog request requires maintenance, the state 804 of the backlog request may change to "pending" or "waiting for maintenance." For example, when the state changes to "pending" the backlog request may be processed in a manner similar to the initial processing of the backlog request.

In some examples, when the state of the backlog request changes to "waiting, for maintenance" and the user interface 800 is presented to a user, the user interface 800 includes a start maintenance option, e.g., instead of the start mapping option 802. The indication that the backlog request is "waiting for maintenance" may assist a user in determining that some data was previously napped to the attributes of the entity.

The analysis system may identify the data and/or entity Attributes that have potentially changed when the employee works on the maintenance process. In some examples, the employee verifies that all of the data mapped to the attributes of the entity is current and has not changed since the previous mapping process.

Once the maintenance process is complete, the state 804 of the backlog request may change to "waiting for approval" and the analysis system may proceed through an approval process similar to the initial approval of a backlog request.

The user interface 800 includes a start time 806 and an end time 808. For example, the start time 806 indicates the time that the mapping process began and the end time 808, indicates when the backlog request was approved.

In some implementations, the list 702 shown in FIG. 7 does not include a list of backlog requests that have been completed, and the analysis system automatically identifies entities which require an update to the mapping between data and attributes for the entity. For example, once a backlog request is approved, the backlog request is removed from the list 702. In these implementations, the analysis system determines when the mapping for an entity should be updated based on new data for the entity and/or a schedule.

FIG. 9 is an example of a user interface 900 for mapping data to attributes of an entity. For example, an employee of an entity analysis company may interact with the user interface 900 during a mapping process, either the initial mapping process or a maintenance mapping process, and/or during an approval process.

The user interface 900 includes an entity name field 902 and a primary domain field 904. The entity name field 902 may represent the legal name of the entity the employee is mapping. For example, the employee may enter the name or the entity as included in corporate filings in the entity name field 902.

In some examples, the primary domain field 904 includes the uniform resource locator from the original backlog request, e.g., the uniform resource locator 604 shown in FIG. 6. In some examples, the employee interacting with the user interface 900 selects another domain as the primary domain for the primary domain field 904. For example, the employee may determine that the entity has multiple domains, potentially associated with different products or services offered by the entity, and select the primary domain from the multiple domains for the entity.

The primary domain field 904 may include a selectable link for the primary domain. For example, the employee may view a webpage for the primary domain in a web page frame 906 or select the selectable link in the primary domain field 904 to open a new window with the webpage for the primary domain. The employee may view the webpage for the primary domain or another domain of the entity to identify data for the mapping of data to attributes of the entity.

For example, the employee may view webpages of the primary domain to determine one or more industries in which the entity offers products and/or services and enter the industries in an industry field 908. For example, the employee may select a search option to view a list of industries and select the determined industries for the entity in the list. The selection of the industries in the list may auto-populate the industry field 908 with the one or more selected industries.

The user interface 900 includes a logo field 910 for the entity. For example, the employee may enter a uniform resource address that identifies a location of the entity's logo, e.g., on the primary domain. In some examples, the employee may store a copy of the logo in a database and enter a link to the location of the logo in the database in the logo field 910.

In some implementations, the user interface 900 presents a copy of the logo. For example, the user interface 900 may include a logo display field below the logo field 910 where the logo display field presents the copy of the logo.

The employee may view information from the primary domain or other resources to determine a description for an entity description field 912. The entity description field 912 may include a general summary of the products and/or services offered by the entity, when the entity was founded, major subsidiaries of the entity, and/or competitors of the entity, to name a few examples.

In some implementations, the user interface 900 includes a customer visible. Selection 914. The customer visible selection 914 indicates whether a customer of the entity analysis company may view information included in the user interface 900, about the entity. For example, when the customer visible selection 914 is selected, the customer may view at least a portion of the data included in the user interface 900, such as the entity name, the primary domain, the entity industries, the logo, and the entity description.

The user interface 900 includes sections for technical data about the entity, such as a virtual Autonomous System numbers section 916 and a mail server configuration section 918, and non-technical data, such as an entity employee counts section 920.

The virtual Autonomous System numbers section 916 allows an employee of the entity analysis company to map one or more Autonomous System numbers to the entity, e.g., to an Autonomous System numbers attribute of the entity. For example, the analysis system may automatically identify one or more Autonomous System numbers assigned to the entity or the user of the user interface 900 may manually enter one or more Autonomous Systems numbers in the virtual Autonomous System numbers section 916. In some examples, the employee may create a new record in the virtual Autonomous System numbers section 916, indicate the registrar that provided the Autonomous System numbers, e.g., a Regional Internet Registry, and the type of data entry, e.g., manual in this example.

The employee may select an edit option 922 for the new record to populate additional information for the record. For example, selection of the edit option 922 may present a user interface 1100 shown in FIG. 11.

The mail server configuration section 918 may be populated automatically or manually with data received from a Domain Name Server, a passive Domain Name Server, or a mail server, as described in more detail above. For example, the analysis system may identify a mail server for the entity, whether the mail server uses one or more validation methods, such as Sender Policy Framework or DomainKeys Identified Mail, and a risk level associated with the mail server based on the validation methods used by the mail server.

The entity employee counts section 920 allows the employee of the entity analysis company to enter information about the number of employees who work for the entity. For example, the employee may enter the total number of employees of the entity and/or the number of employees that work for a separate division or group within the entity, such as information technology, human resources, marketing, research and development, hardware, software, small business, or home users, e.g., as separate records in the entity employee counts section 920.

When a user is approving a backlog request, e.g., during the "approval in progress" state, the user may review the data mapped to the attributes of the entity and approve or reject the mapped data. For example, the approver may verify the accuracy of the data in the virtual Autonomous System numbers section 916, the mail server configuration section 918, and the entity employee counts section 920 and indicate approval of the data with selection of one or more approved selections 924a-c. In some examples, each entry in the sections includes a separate approved selection that the user may select to approve the backlog request.

Upon selection of all the approved selections 924a-c, the user may select a main approved selection 926 and then save the backlog request to enable the finish approval option in the user interface 800, discussed in more detail above. For example, the main approved selection 926 may not be enabled until the user has approved all of the separate approved selections 924a-c in the user interface 900.

In some implementations, one or more of the approved selections 924a-c may not be enabled until the user approves one or more portions of data associated with a record. For example, the approver may need to view and approve data in the user interface 1100, shown in FIG. 11, prior to approving the record in the virtual Autonomous System numbers section 916.

In some implementations, one or more portions of the approval process may be automated. For example, the analysis system may perform an automatic approval process for the entity employee counts section 920 and/or other data mapped to the attributes of the entity.

Figure 10:
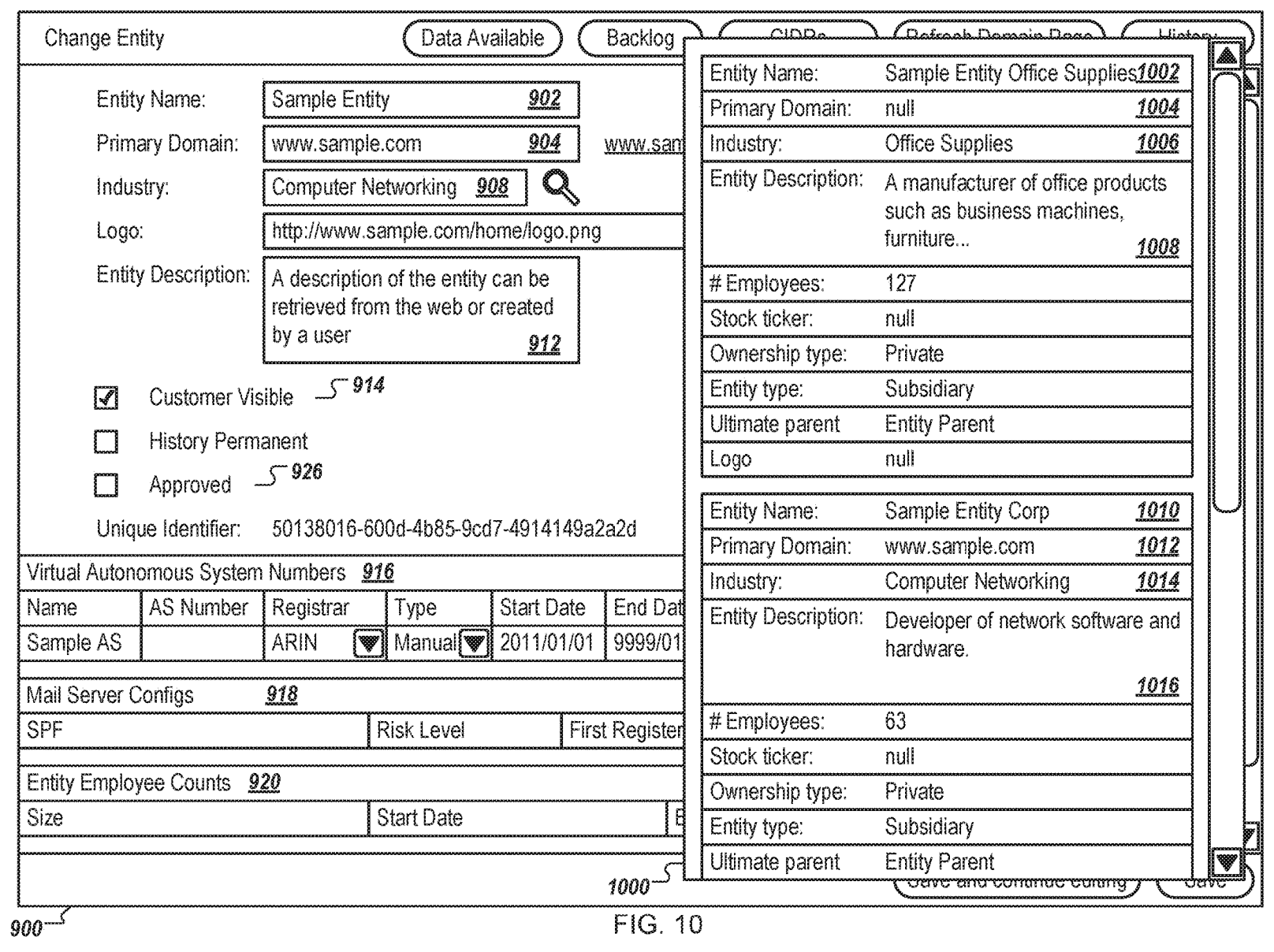

FIG. 10 is an example of a user interface 1000 for viewing data for an entity. For example, when the analysis system includes data for a quantity of entities that have a name similar to the entity name in the entity name field 902, the user interface 1000 may present a list of results that include information for the entities that have the similar names.

The user interface 1000 includes a first entity name 1002 and details for the first entity name 1002, such as a first primary domain 1004 for the first entity, a first industry 1006, and a first entity description 1008, to name a few examples. The user interface also includes a second entity name 1010 and associated details for the second entity name 1010, such as a second primary domain 1012, a second industry 1014 for the second entity, and a second entity description 1016.

The user may select one of the entities from the user interface 1000 based on the details associated with the entity and enter the details in the user interface 900. For example, the user may determine that the second primary domain 1012 matches the primary domain in the primary domain field 904 and that the second entity name 1010 is for the current backlog request. The user may then enter the details in the user interface 900, manually or select an option to have the details data, automatically entered into the user interface 900.

Figure 11:
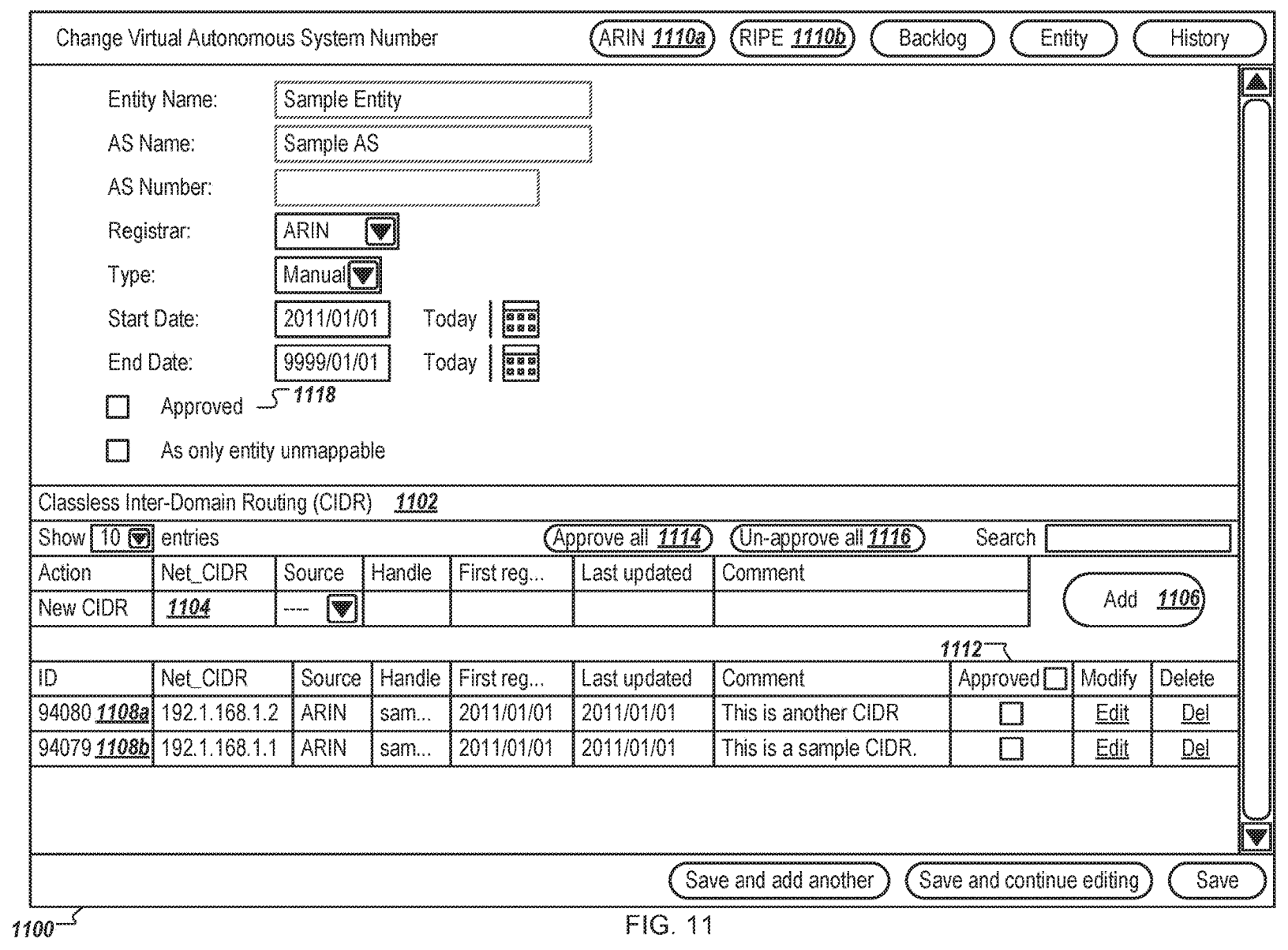

FIG. 11 is an example of a user interface 1100 for changing a virtual Autonomous System number, in the data mapping for an entity. For example, a user may interact with the user interface 1100 to add, edit, or remove one or more Classless Inter-Domain. Routing entries for an entity mapping.

The user interface 1100 includes a Classless Inter-Domain Routing (CIDR) section 1102 for a user to add one or more CIDR records to a virtual Autonomous System number for an entity. For example, the user may enter data into a new CIDR record 1104 and select an add new CIDR option 1106 and the analysis system will add a new CIDR record to a list of records in the CIDR section 1102.

Each CIDR record 1108a-b includes an Internet Protocol address, a source, such as one of the Regional Internet Registries, a first registered date, a last updated date, and a comment. For example, a user may view data for the entity, e.g., in another window, and manually create the CIDR record 1108a indicating that the source of the record is the American Registry for Internet Numbers (ARIN) based on the source of the viewed data.

In some examples, the user may select one of Regional Internet Registry options 1110a-b to automatically add one of the CIDR records 1108a-b to the user interface 1100. For example, the user may select an ARIN option 1110a or a Réseaux IP Européens Network Coordination Centre (RIPE) option 1110b to automatically receive data for one of the CIDR records 1108a-b as described in more detail with reference to a user interface 1200 shown in FIG. 12.

During the approval process, a user of the user interface 1100 may select one or more approved selections after verifying the accuracy of the data entered in the user interlace 1100. For example, the user may review the CIDR records 1108a-b and select the approved selection 1112 to approve the CIDR records 1108a-b. In some examples, the user may individually select an approved selection for each of the CIDR records 1108a-b instead of the approved selection 1112.

In some implementations, during the approval process, the user may select an approve all option 1114 or an un-approve all option 1116 after reviewing one or more of the CIDR records 1108a-b. For example, the user may determine that all of the CIDR records 1108a-b are accurate and select the approve all option 1114.

Selection of the approve all option 1114 presents information in the user interface 1100 indicating that the CIDR records 1108a-b are approved. For example, upon selection of the approve all option 1114, the approved selection for each of the CIDR records 1108a-b and the approved selection 1112 may include a check mark.

In some implementations, after each of the CIDR records 1108a-b are approved, a main approved selection 1118 is enabled, allowing the user to finalize the approval of the virtual Autonomous System number entry. The use of multiple approval options may ensure that a user does not approve a record in the CIDR section 1102 unintentionally.

FIG. 12 is an example of a user interface 1200 for automatically retrieving Classless Inter-Domain Routing data from a Regional Internet Registry or an Internet Assigned Numbers Authority. For example, the user interface 1200 receives a search string in a search field 1202, and the analysis system provides the search string to one or more Regional Internet Registries and presents received search results in a general results section 1204 of the user interface 1200.

A user may select one or more of the results presented in the general results section 1204 using one or more general selection options 120*a-c* and select a fetch detailed results option 1208. Upon selection of the fetch detailed results option 1208, the analysis system retrieves details for the selected results, e.g., from memory of the analysis System or one or more of the Regional Internet Registries.

The user interface 1200 presents the detailed results in a detailed results section 1210 and includes information such as an address, a quantity of networks, and a quantity of points of contact. The user may request addition information for one of the records in the detailed results section 1210 and view the additional information for the record in a network section 1212 and a point of contact section 1214. In some implementations, the user interface 1200 presents the results of the search string query in the detailed results section 1210 instead of the general results section 1204.

The user may select one or more of the records in the detailed results section 1210 using detailed selection options 1216*a-b* and map the selected detailed results to an entity by selecting a save selected CIDRs option 1218. For example, selection of the save selected CIDRs option 1218 may create the CIDR record 1108*b* in the user interface 1100 shown in FIG. 11.

In some implementations, the user interface 1200 receives data from a single Regional Internet Registry. For example, the user interface 1200 may be associated with a single predetermined Regional Internet Registry. In some examples, the user interface 1200 may include a Regional Internet Registry selection that allows a user to select the Regional Internet Registry that receives the search string the user enters in the search field 1202. In some implementations, the user interface 1200 presents results for multiple different Regional Internet Registries.

In some implementations, one or more of the detailed results may not include data for all of the fields in the network section 1212 and/or the point of contact section 1214. For example, a first Regional Internet Registry may include data for all of the fields in the network section 1212 and the point of contact section 1214 and a second Regional Internet Registry may include data for some of the fields in the network section 1212.

Figure 13:
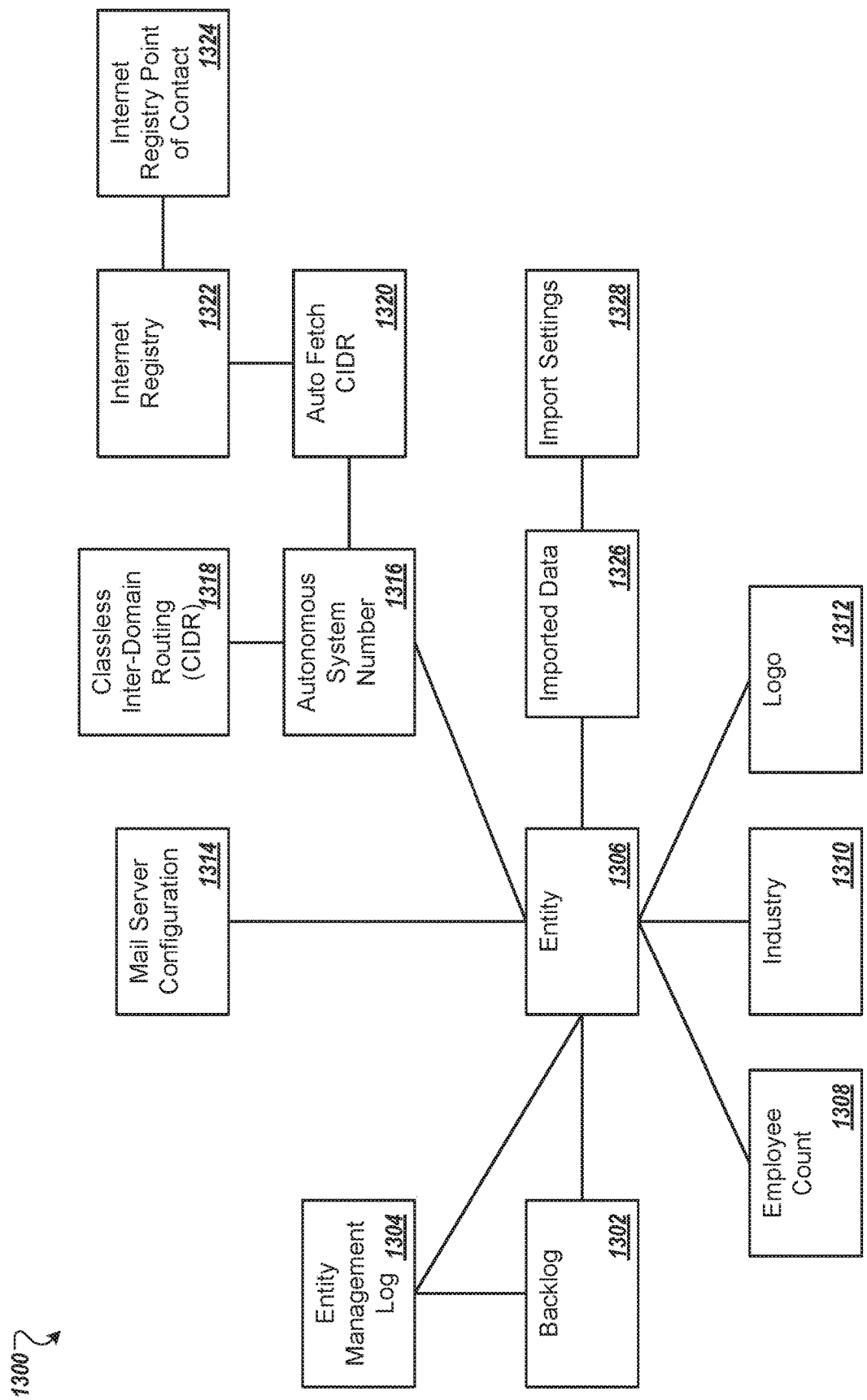

FIG. 13 is a block diagram of an example database schema 1300 of entity attribute data. When a user creates a backlog request for an entity, a backlog object 1302 is created in a database and a record for the backlog object 1302 is created in an entity management log 1304. For example, the entity management log 1304 includes a record of all activities associated with the creation of a backlog object 1302 and the mapping of data to entity attributes.

The database schema 1300 includes an entity object 1306 that includes one or more attributes of the entity. For example, the entity object 1306 includes the entity name, the primary domain of the entity, and a unique identifier for the entity. In some examples, when a backlog object 1302 is created for an entity, an entity object 1306 is also created for the entity.

When a user maps data to the attributes of the entity, an employee count object 1308, one or more industry objects 1310, and a logo object 1312 may be created. For example, the employee count object 1308 may include fields for the total number of employees that work for the entity, a last updated date, and an approved Boolean value.

In some examples, the industry object 1310 may include the name of an industry associated with an entity, a last updated date, and an approved Boolean value. In some implementations, an entity object 1306 may be associated with multiple industry objects, for example, when an entity provides multiple different products or services. In some implementations, multiple entity objects 1306 may be associated with the same industry object 1310. For example, when multiple entities are competitors, the entity objects 1306 for the competitors may be associated with the same industry object 1310.

The logo object 1312 may include a uniform resource locator that identifies a location of the entity's logo and properties of the logo. For example, the logo object 1312 may include a height, a width, and a mime type for the logo.

An entity object 1306 may be associated with one or more mail server configuration objects 1314. For example, each of the mail server configuration objects 1314 may include data representing attributes of a mail server used by the entity. The mail server may be hosted by the entity or by a third party, e.g., as part of a cloud service. The mail server configuration object 1314 may include fields for one or more validation methods used by the mail server, such as Sender Policy Framework and DomainKeys Identified Mail. In some examples, the mail server configuration object 1314 includes data representing a risk level of the mail server.

One or more Autonomous System number objects 1316 may be associated with the entity object 1306. For example, a user may associate an Autonomous System number object 1316 with the entity object 1306 by interacting with the user interface 900. The Autonomous System number object 1316 may include a name for the Autonomous System number and a registrar, such as one of the Regional Internet Registries.

Each of the Autonomous System number objects 1316 may be associated with one or more Classless Inter-Domain Routing (CIDR) objects 1318. For example, the CIDR object 1318 may include a block of Internet Protocol addresses that are assigned to the entity. In some examples, the CIDR object 1318 includes a source field, e.g., to identify a Regional Internet Registry, a handle, e.g., used by the Regional Internet Registry, and/or a comment, e.g., received from the Regional Internet Registry or a user who created the CIDR object 1318.

In some implementations, the Autonomous System number object 1316 may be associated with one or more auto fetch CIDR objects 1320. For example, when a user manual enters CIDR data, e.g., when the user manually creates the new CIDR record 1104 shown in FIG. 11, the analysis system may create a CIDR object 1318, and when the analysis system provides the user with CIDR data, e.g., using the user interface 1200, or automatically creates a new CIDR record, the analysis system may create an auto fetch CIDR object 1320.

The auto fetch CIDR object 1320 may include a block of Internet Protocol addresses assigned to the entity, a source field, a handle, and one or more comments. For example, the comments may be comments received from the Regional Internet Registry, e.g., identified by the source field, or the user who interacted with the user interface 1200.

Each of the auto fetch CIDR objects 1320 is associated with an Internet registry object 1322. For example, the Internet registry object 1322 includes the name, handle, and address of the Regional Internet Registry identified in the source field of the auto fetch CIDR object 1320. In some examples, multiple different auto fetch CIDR objects 1320 may be associated with the same Internet registry object 1322, e.g., when each of the multiple different auto fetch CIDR objects 1320 have the same source.

The Internet registry object 1322 is associated with one or more Internet registry point of contact objects 1324. For example, each of the Internet registry point of contact objects 1324 includes a name for the point of contact, a description of the point of contact, e.g., the title of the point of contact, and contact information for the point of contact. The contact information may include the name of the company that employs the point of contact, the company's address, and a phone number and email address for the point of contact.

In some implementations, the database schema 1300 includes an imported data object 1326. For example, the imported data object 1326 may include data received from third parties, and/or data retrieved by the analysis system, e.g., from the data sources described with reference to FIG. 3. The data sources may include sources of financial data, statistics about the entity, information about the assets of the entity, trace data, and corporate tree information, e.g., subsidiary and/or parent entities, to name a few examples.

The imported data object 1326 may be associated with an import settings object 1328 that includes settings associated with the imported data. For example, when the imported data is received from a third party, the import settings object 1328 may include credentials that allow the entity analysis company and the analysis system to access data from the third party. When the imported data includes data retrieved by the analysis system, the import settings object 1328 may include data indicating the frequency of data retrieval, the types of data retrieved by analysis system, and/or credentials for the analysis system to access data, to name a few examples.

In some implementations, at least some of the objects in the database schema 1300 include an approved Boolean value. For example, the value may indicate whether or not the data in the associated object has been approved.

In some implementations, when the approved Boolean value for an object is true and one of the fields for the object is changed, the approved Boolean value is automatically set as false. For example, the analysis system may automatically set the approved Boolean value for an industry as false when the associated industry name is changed.

In some implementations, all of the objects in the database schema 1300 include a last updated date.

In some implementations, one or more of the objects in the database schema 1300 include a start date and an end date. For example, the use of the start date and the end data may allow representation of changes over time in the data mapped to an entity. For example, the entity object 1306 may have a first employee count object 1308, with a start date of "2011-01-01" and an end date of "2011-07-01" with an employee count value often, and a second employee count object 1308, with a start date of "2011-07-02," an end date of "2012-01-15," and an employee count value of twenty. In some examples, the industry object 1310, the logo 1312, the mail server configuration object 1314, the Autonomous System number object 1316, the Classless Inter-Domain Routing objects 1318, and the auto fetch CIDR 1320 include a start date and an end date.

In some implementations, when data is initially associated with an attribute of an entity the end date is set to a future date, e.g., two hundred years from the current date. When updated data is associated with the attribute, e.g., an employee count of twenty, the end date of the original object is updated and a new object is created for the updated data. For example, the analysis system may create the first employee count object with a start date of "2011-01-01," an end date of "3011-01-01," and an employee count value of ten. When the analysis system determines that the employee count for the entity is twenty, through either an automatic, semi-automatic, or manual process, the analysis system updates the end date of the first employee count object, e.g., to "2011-07-01," and creates the second employee count object with the updated data, such as an employee count of twenty, a start date of "2011-07-02," and an end date of "3011-07-01"

In some implementations, the start dates and end dates of similar objects for the same entity may overlap. For example, the end date of the first employee count object and the start date of the second employee count object may be the same date, e.g., "2011-07-01." In some examples, the end date of a first Classless Inter-Domain Routing object may be "2013-05-12," e.g., where the start date is "2012-01-01," and the start date of a second Classless Inter-Domain Routing object may be "2013-20-27," where both objects are associated with the same entity.

The use of the start date and the end date may allow the analysis system to record data history for an entity and use the data history when determining a security rating for the entity.

In some implementations, some of the objects in the database schema 1300 include automated maintenance data. For example, the automated maintenance data may include one or more criteria that, when satisfied, indicate that the corresponding object should be updated or a new object of the same type should be created. For example, the maintenance criteria for an auto fetch CIDR object 1320 obtained from a Regional Internet Registry may be a date and/or a time, such as a last updated date, a start date, or a maintenance data that indicates when maintenance should be performed. The analysis system uses the maintenance criteria to determine when to periodically query the Regional Internet Registry to determine whether a unique handle or a range of Internet Protocol address for the auto fetch CIDR object 1320 have changed, and update the auto fetch CIDR object 1302 or create a new object accordingly.

FIG. 14 is a flow diagram of a process 1400 for inferring a security state of an entity. For example, the process 1400 can be carried out by the analysis system 302 from the environment 300 shown in FIG. 3.

Traces of activities of an online user who is associated with an entity are received (1402). For example, the analysis system may receive data that indirectly represent the activities of the online user. In some examples, the traces represent user interaction with a social media network, entity email communications, and/or content presented to the user, e.g., as indicated by cookies stored on a device operated by the user.

In some implementations, the traces of the activities maintain the privacy of the online user. For example, data may indicate that the online user made a post to a social media network but not include the content of the post.

In some implementations, the traces include tracking of an identity of the online user between two of the different contexts. For example, the traces may represent activity of the user at different times or on different devices. In some examples, the analysis system performs the tracking based on cookies associated with advertising directed to the user. For example, the analysis system may receive cookie tracking information from a third party and use the cookie tracking information to identify the different contexts of the identity of the online user.

In some implementations, the traces include indications of security checks made with respect to communications associated with the user. For example, the security checks may include indications of whether email messages conform to DomainKeys Identified Mail standards or email domains conform to Sender Policy Framework. In some examples, the security checks include a determination of whether a mail server that provides electronic mail to the online user employs one or more validation methods.

A security state of the entity is inferred by analysis of the traces (1404). For example, the analysis system may determine whether the traces indicate that an account of the user may have been compromised, whether the entity allows employee devices to access confidential data, or security policies used by a mail server that provides electronic mail communications for the entity.

In some implementations, the traces indicate successful attacks on computer systems of the entity. For example, the traces may indicate that a social media account of the online user was compromised. In some examples, the traces may indicate that the online user is receiving malicious mail and that a domain identified as the origin of some of the malicious mail may have been compromised.

In some implementations, the analysis includes a comparison of traces that originated in different contexts of the user's online activities. For example, the comparison may be between traces associated with different times of online user activity where the different contexts include different times.

In some examples, the comparison is between traces where traces that originated at one of the times reflect a user deletion relative to the traces that originated at an earlier time. For example, a first set of traces may identify a post made by the online user and a second set of traces may indicate that the post was later deleted by the online user. The analysis system may determine, for example, that the traces that originated at one of the times reflect a user deletion of malicious data or code relative to the traces at the earlier time.

In some implementations, the different contexts include a context the security of which is controlled by the entity and a context the security of which is at least partly uncontrolled by the entity. For example, the controlled context may include a computer system or device made accessible by the entity to the user, e.g., an entity device, and the partly uncontrolled context may include a computer system or device owned by the user, e.g., a user device. The analysis system may determine that the entity device and the user device are operated by the same online user, for example, based on tracking information, such as cookies, stored on both devices. In some examples, the analysis system may determine that the security of the user device is not optimal, infer that the online user may take security risks when operating the entity device, and that the security state of the entity is lower than if the online user did not take security risks.

In some examples, the controlled context and the partly uncontrolled context may include the same computer system or device. For example, the analysis system may identify an entity device or a user device that connects to an entity network and another network different than the entity network. The analysis system may identify the controlled context when the device connects to the entity network and the partly uncontrolled context when the device connects to the other network. In some examples, the analysis system identifies the controlled context and the partly uncontrolled context with cookie tracking data for a cookie stored on the computer system or device.

In some implementations, the process 1400 can include additional steps, fewer steps, or some of the steps can be divided into multiple steps. For example, the analysis system may distinguishing between traces that represent a less satisfactory security state of the entity and traces that represent a more satisfactory security state of the entity. In some examples, the analysis system distinguishes the traces prior to inferring the security state of the entity.

FIG. 15 is a flow diagram of a process 1500 for enabling a user to assist in the generation of an entity map. For example, the process 1500 can be carried out by the analysis system 302 from the environment 300 shown in FIG. 3.

A map is generated between (a) technical assets that contribute to security characteristics of respective entities and (b) the identities of the entities that are associated with the respective technical assets, at least pan of the generating of the map being done automatically (1502). For example, the analysis system may determine one or more Internet Protocol addresses assigned to an entity and map the Internet Protocol addresses to a Classless Inter-Domain Routing section attribute of the entity.

In some implementations, the technical assets include network-related information. For example, the network-related information may include at least one of Internet Protocol addresses, blocks of Internet Protocol addresses, mail server configurations, domain names, social media handles, third-party data hosting, internet service providers. Domain Name System (DNS) services, Autonomous System numbers, and Border Gateway Protocol (BGP) advertisements.

In some implementations, the generation of the map includes online discovery of information about the technical assets. For example, the analysis system may query Domain Name Servers, one or more Regional Internet Registries, or an Internet Assigned Numbers Authority to determine some of the technical assets for the entity. In some examples, the information about the technical assets is discovered through passive DNS queries.

In some implementations, the analysis system may identify from the passive DNS queries associations between domain names and network addresses. For example, the analysis system may perform the process 1600, described below with reference to FIG. 16, to determine associations between domain names and network addresses. In some examples, the network addresses include Internet Protocol addresses. In some implementations, an association between a domain name and a network address includes a network address that is assigned to a domain name, in some examples, an association between a domain name and a network address includes a domain name that maps to the network address.

A user is enabled to assist in the generating of the map by presenting to the user through a user interface (a) data about the technical assets of entities and (b) an interactive tool for associating the technical assets with the identities of the entities (1504). For example, the analysis system presents a user interface to the user to allow the user to map data representing technical assets of an entity to attributes of the entity. In some examples, the tool enables the user to assign a technical asset to an entity.

The order of steps in the process 1500 described above is illustrative only, and enabling the user to assist in the generation of the entity map can be performed in different orders. For example, the analysis system may enable the user may to assist in the generation of the map prior to the generation of the map. In some examples, the analysis system may generate the map while enabling the user to assist in the generation of the map.

In some implementations, the process 1500 can include additional steps, fewer steps, or some of the steps can be divided into multiple steps. For example, the analysis system may present to the user non-technical-asset information through the user interface. In some implementations, the non-technical-asset information includes information about the entities. In some examples, the non-technical-asset information about the entities includes at least one of descriptions of entities, industry classifications, and employee counts.

In some implementations, the process 1500 invokes external crowd-sourced services to aid in generating the map. For example, the analysis system may provide a portion of data for the technical assets to a crowd-sourced service and receive a map of the provided data to one or more of the entities. In some examples, the analysis system provides the portion of data to the crowd-sourced services such that each person who participates in the crowd-sourced service is able to view only a portion of the data associated with an entity.

In some implementations, the process 1500 enables a separate review and approval of entities proposed to be included in the map. For example, the analysis system may require a first user to map data to attributes of an entity, and a second user to review and approve the data map.

In some implementations, the process 1500 provides the map to an application for joining to event data or scoring the security state of the entities. For example, the analysis system may receive the map and determine a security rating and corresponding confidence score for an entity where the map includes data for the entity. In some examples, when the map includes a portion of the data for an entity, e.g., received from a crowd-sourced service or from different data sources, the analysis system receives the map and joins the map with data from the different data sources.

In some implementations, the process 1500 generates graphs of relationships among entities based on their associations with technical assets. For example, the analysis system may generate a graph that shows a relationship between two entities that use the same cloud service or web host. The analysis system may use the relationships among entities to determine security ratings for the different entities. For example, if a first entity's data that is hosted by the cloud service is compromised, then the security score of a second entity that uses the same cloud service may be lower than if the first entity's data was not compromised.

In some implementations, the process 1500 tracks changes over time in the network addresses that are associated with a given domain name. For example, the analysis system identifies changes in the network addresses that are associated with the given domain name and determines a security rating for the entity based on the changes.

In some implementations, the generation of the map that is done automatically includes at least one of collecting information about technical assets and about entities, associating technical assets with entities, and approving proposed portions of the map. For example, the analysis system may automatically approve one or more portions of the map that a user manually generates.

In some examples, the analysis system may automatically retrieve data from one or more data sources and/or automatically associate retrieved data with an entity. For example, the analysis system may identify a range of Internet Protocol addresses assigned to the entity and map the identified Internet Protocol addresses to a Classless Inter-Domain Routing section attribute of the entity.

FIG. 16 is a flow diagram of a process 1600 for mapping Internet Protocol addresses to an entity. For example, the process 1600 can be carried out by the analysis system 302 from the environment 300 shown in FIG. 3.

A first domain name for an entity is received (1602). For example, the analysis system receives the first domain name from a user interface. The entity may be one of multiple entities. For example, the analysis system may perform the process 1600 for each entity in the multiple entities.

A first passive DNS query is sent to identify first name servers for the first domain name (1604). For example, the analysis system provides the first passive DNS query to a DNS server.

A list of the first name servers for the first domain is received (1606). For example, the DNS server determines the list of first name servers for the first domain and provides the list of first name servers for the first domain to the analysis system.

A second passive DNS query is sent, for each of the first name servers, to identify second domain names for which the name server is authoritative (1608). For example, the analysis system sends the second passive DNS queries to the DNS server.

A list is received, for each of the first name servers, of the second domain names for which the name server is authoritative (1610). For example, for each of the second passive DNS queries, the DNS server determines the list of second domain names for which the name server for the first domain is also authoritative.

A third passive DNS query is sent, for each of the second domain names, to identify host names for the hosts of the second domain name and Internet Protocol addresses for the host names (1612). For example, the analysis system sends the third passive DNS queries to the DNS server.

A list of the host names and the Internet Protocol addresses for the host names is received (1614). For example, for each of the third passive DNS queries, the DNS server identifies the host names for the second domain names and the Internet Protocol addresses assigned to the host names. In some implementations, the list of host names includes the names of the first name servers.

Each of the Internet Protocol addresses is mapped to an attribute for the entity (1616). For example, the analysis system automatically maps the Internet Protocol addresses to Classless Inter-Domain Routing block for the entity.

Figure 17:
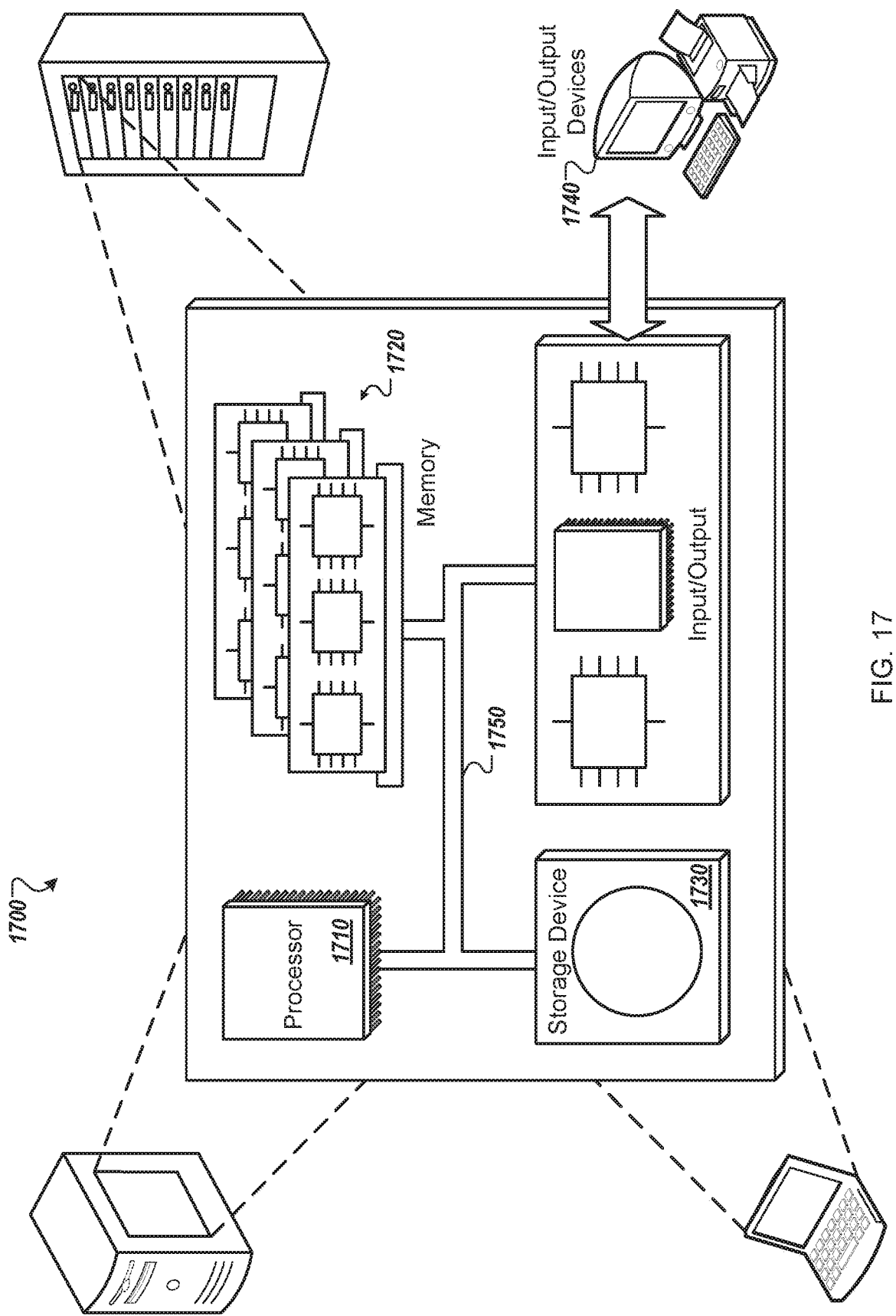

FIG. 17 is a block diagram of an example computer system 1700. For example, referring to FIG. 3, the analysis system 302 or a server forming a portion of the analysis system 302 could be an example of the system 1700 described here, as could a computer system used by any of the users who access resources of the environment 100, the environment 200, the environment 300, the environment 400, or the environment 500. The system 1700 includes a processor 1710, a memory 1720, a storage device 1730, and an input/output device 1740. Each of the components 1710, 1720, 1730, and 1740 can be interconnected, for example, using a system bus 1750. The processor 1710 is capable of processing instructions for execution within the system 1700. In some implementations, the processor 1710 is a single-threaded processor. In some implementations, the processor 1710 is a multi-threaded processor. In some implementations, the processor 1710 is a quantum computer.

The processor 1710 is capable of processing instructions stored in the memory 1720 or on the storage device 1730. The processor 1710 may execute operations such as the steps described above in reference to the process 1400 (FIG. 14), the process 1500 (FIG. 15), or the process 1600 (FIG. 16).

The memory 1720 stores information within the system 1700. In some implementations, the memory 1720 is a computer-readable medium. In some implementations, the memory 1720 is a volatile memory unit. In some implementations, the memory 1720 is a non-volatile memory unit.

The storage device 1730 is capable of providing mass storage for the system 1700. In some implementations, the storage device 1730 is a computer-readable medium. In various different implementations, the storage device 1730 can include, for example, a hard disk device, an optical disk device, a solid-date drive, a flash drive, magnetic tape, or some other large capacity storage device. In some implementations, the storage device 1730 may be a cloud storage device, e.g., a logical storage device including multiple physical storage devices distributed on a network and accessed using a network. In some examples, the storage device may store long-term data, such as the log 412 in the database 410 (FIG. 4), as well as the entity names 112 in the database 110 (FIG. 1). The input/output device 1740 provides input/output operations for the system 1700. In some implementations, the input/output device 1740 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 1700 to communicate, for example, transmit and receive data such as data from the data sources 104 shown in FIG. 1. In some implementations, the input/output device can include driver devices configured to receive input data and send output data to other input/output devices, e.g., keyboard, printer and display devices 1760. In some implementations, mobile computing devices, mobile communication devices, and other devices can be used.

A server (e.g., a server forming a portion of the analysis system 302 shown in FIG. 3) can be realized by instructions that upon execution cause one or more processing devices to carry out the processes and functions described above, for example, storing the entity names 112 in the database 110 and assigning the entity names 112 corresponding security ratings 114 and confidence scores 116 (FIG. 1). Such instructions can include, for example, interpreted instructions such as script instructions, or executable code, or other instructions stored in a computer readable medium. A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 17, implementations of the subject matter and the Junctional operations described above can be implemented in other types of digital electronic circuitry, or in computer software, firmware, or hardware, including the structures disclosed in this specification and their structural equivalents, or in combinations of one or more of them.

Implementations of the subject matter described in this specification, such as software for mapping data to entities and assigning security ratings and confidence scores to entities (FIGS. 1-5), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices, magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the analysis system 302) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

For example, although we have described examples in which the information received and analyzed by the system is used for determining security characteristics of an entity, the results of the analysis provide useful information about the entity that could be used for a variety other purposes and in other ways.

The invention claimed is:

1. A method comprising:
receiving traces of activities of a plurality of employees of an entity, wherein the traces of the employees' activities are received from a plurality of disassociated sources including a shared service servicing multiple entities; and
inferring, by analysis of the traces of the employees' activities and a use of the shared service, a security rating for the entity,
wherein the analysis comprises a comparison of traces that originated in different contexts of online activities of at least one employee of the plurality of employees,
the different contexts comprise a context the security of which is controlled by the entity and a context the security of which is at least partly uncontrolled by the entity, and
the controlled context comprises a computer system or device owned by the entity and made accessible to the at least one employee, and the partly uncontrolled context comprises a computer system or device owned by the at least one employee.

2. The method of claim 1 in which the traces of at least one employee's activities indicate successful attacks on computer systems of the entity.

3. The method of claim 1 comprising distinguishing between traces of the employees' activities that represent a less satisfactory security rating of the entity and traces of the employees' activities that represent a more satisfactory security rating of the entity.

4. The method of claim 1 in which the different contexts comprise different times.

5. The method of claim 4 in which the traces of an employee's activities that originated at one of the times reflect a deletion of a social media post relative to the traces of the employee's activities that originated at an earlier time.

6. The method of claim 4 in which the traces of an employee's activities that originated at one of the times reflect a deletion of malicious data or code relative to the traces of the employee's activities at the earlier time.

7. The method of claim 1 in which the traces of the employees' activities comprise tracking of an identity of at least one employee of the plurality of employees between two of the different contexts.

8. The method of claim 7 in which the tracking comprises cookies associated with advertising directed to at least one employee of the plurality of employees.

9. The method of claim 1 in which the traces of the employees' activities comprise indications of security characteristics with respect to communications associated with at least one employee of the plurality of employees.

10. The method of claim 9 in which the security characteristics comprise indications of whether email messages of the employee conform to DomainKeys Identified Mail standards or email domains conform to Sender Policy Framework.

11. The method of claim 1 in which the traces of the employees' activities comprise logs of online activities of the employees of the entity.

12. The method of claim 1 in which the traces of employees' activities comprise information associated with an employee device that represents online activities of an employee of the plurality of employees.

13. The method of claim 12 in which the information associated with the employee device comprises information about one or more cookies stored in a memory of the employee device.

14. The method of claim 1 in which the traces of employees' activities comprise information about social media activities of at least one employee.

15. The method of claim 1 in which the traces of employees' activities comprise information about email communications of at least one employee.

16. The method of claim 1 in which the traces of employees' activities comprise information about content presented to at least one employee of the plurality of employees.

17. The method of claim 1 in which the traces of employees' activities comprise information about receipt by at least one online user employee of malicious mail and the compromise of a domain identified as an origin of the malicious mail.

18. A method comprising:
receiving traces of activities of a plurality of employees of an entity, wherein the traces of the employees' activities are received from a plurality of disassociated sources including a shared service servicing multiple entities, the traces comprising indications of security characteristics with respect to electronic signals associated with the employees; and
inferring, by analysis of the traces of the employees' activities and a use of the shared service, a security rating for the entity, wherein at least one trace of the employees' activities originated from a device controlled by the entity and at least one trace of the employees' activities originated from a device not controlled by the entity,
wherein the security characteristics comprise indications of whether email messages of employees conform to DomainKeys Identified Mail standards or email domains conform to Sender Policy Framework.

19. The method of claim 18 in which the traces of at least one employee's activities indicate successful attacks on computer systems of the entity.

20. The method of claim 18 comprising distinguishing between traces of the employees' activities that represent a less satisfactory security rating of the entity and traces of the employees' activities that represent a more satisfactory security rating of the entity.

21. The method of claim 18 in which the traces of the employees' activities originate in different times.

22. The method of claim 21 in which the traces of an employee's activities that originated at one of the times reflect a deletion of a social media post relative to the traces of the employee's activities that originated at an earlier time.

23. The method of claim 21 in which the traces of an employee's activities that originated at one of the times reflect a deletion of malicious data or code relative to the traces of the employee's activities at the earlier time.

24. The method of claim 18 in which the traces of the employees' activities comprise tracking of an identity of at least one employee of the plurality of employees between two of the contexts.

25. The method of claim 24 in which the tracking comprises cookies associated with advertising directed to at least one employee of the plurality of employees.

26. The method of claim 18 in which the traces of employees' activities comprise logs of online activities of the employees of the entity.

27. The method of claim 18 in which the traces of employees' activities comprise information associated with an employee device that represents online activities of an employee of the plurality of employees.

28. The method of claim 27 in which the information associated with the employee device comprises information about one or more cookies stored in a memory of the employee device.

29. The method of claim 18 in which the traces of employees' activities comprise information about content presented to at least one employee of the plurality of employees.

30. The method of claim 18 in which the traces of employees' activities comprise information about receipt by at least one employee of the plurality of employees of malicious mail and the compromise of a domain identified as an origin of the malicious mail.

* * * * *

UNITED STATES PATENT AND TRADEMARK OFFICE
CERTIFICATE OF CORRECTION

PATENT NO. : 10,785,245 B2
APPLICATION NO. : 16/405121
DATED : September 22, 2020
INVENTOR(S) : Philip J. S. Gladstone et al.

It is certified that error appears in the above-identified patent and that said Letters Patent is hereby corrected as shown below:

In the Claims

In Column 34, Claim 17, Line 32, delete "online user".

Signed and Sealed this
Nineteenth Day of September, 2023

Katherine Kelly Vidal
*Director of the United States Patent and Trademark Office*